United States Patent [19]

Beecken

[11] Patent Number: 4,540,523

[45] Date of Patent: Sep. 10, 1985

[54] PHENYLALKYLAMINO-STYRYL DYESTUFFS

[75] Inventor: Hermann Beecken, Berg.-Gladbach, Fed. Rep. of Germany

[73] Assignee: Bayer Aktiengesellschaft, Leverkusen, Fed. Rep. of Germany

[21] Appl. No.: 197,739

[22] Filed: Oct. 17, 1980

Related U.S. Application Data

[62] Division of Ser. No. 891,806, Mar. 30, 1978, Pat. No. 4,258,182.

[30] Foreign Application Priority Data

Apr. 1, 1977 [DE] Fed. Rep. of Germany ....... 2714653

[51] Int. Cl.³ .................... C09B 23/01; C09B 23/04; C09B 23/16; D06P 1/42
[52] U.S. Cl. ............................ 260/465 D; 260/239 B; 544/52; 544/58.1; 544/102; 544/105; 544/163; 544/402; 546/246; 546/247; 546/248; 546/330; 548/341; 548/444; 548/491
[58] Field of Search ........... 260/465 D, 465 E, 239 B; 542/414, 415, 416, 417, 421, 424, 468; 544/163, 402, 52, 58, 105, 102; 546/246, 247, 248, 330; 548/341, 444, 491

[56] References Cited

U.S. PATENT DOCUMENTS

| | | | |
|---|---|---|---|
| 3,247,215 | 4/1966 | Fisher et al. | 260/465 D |
| 3,742,012 | 6/1973 | Bauman | 260/465 D |
| 3,829,461 | 8/1974 | Raue et al. | 260/465 D |
| 3,849,470 | 11/1974 | Cresswell et al. | 260/465 F |
| 3,920,720 | 11/1975 | Beecken | 260/465 E |
| 3,950,378 | 4/1976 | Cresswell et al. | 260/465 E |
| 3,954,830 | 5/1976 | Renfrew et al. | 260/465 D |
| 3,991,050 | 11/1976 | Cresswell et al. | 260/465 E X |
| 3,998,814 | 12/1976 | Cresswell et al. | 260/465 E X |
| 4,017,486 | 4/1977 | Buell et al. | 542/421 X |
| 4,035,380 | 7/1977 | Peter et al. | 260/465 D X |

Primary Examiner—Floyd D. Higel
Attorney, Agent, or Firm—Sprung Horn Kramer & Woods

[57] ABSTRACT

Cationic styryl dyestuffs of the formula

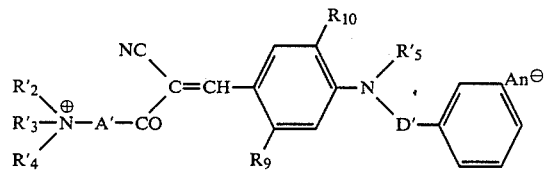

in which
$A^1$ is an alkyleneoxy or alkyleneamino radical,
$D^1$ is a direct bond or divalent radical,
An is an anion, and
the terminal phenyl ring is unsubstituted or substituted by CN, alkyl or alkoxy. The compounds are suitable for dyeing, enscribing and printing paper for dyeing and printing synthetic fibres, especially made of polyacrylonitrile, acid-modified polyesters or polyamides.

8 Claims, No Drawings

PHENYLALKYLAMINO-STYRYL DYESTUFFS

This is a division of Application Ser. No. 891,806, filed Mar. 30, 1978 now U.S. Pat. No. 4,258,182.

The present invention relates to styryl dyestuffs of the general formula

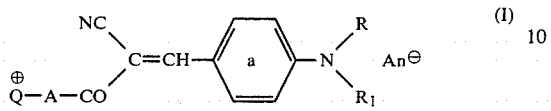

wherein
  $Q^\oplus$ represents a grouping containing a quaternary or protonised tertiary nitrogen atom and
  A represents a bridge member,
  at least one of the radicals R and $R_1$ denotes a carbocyclic or heterocyclic 5-membered or 6-membered ring optionally bonded via a linking member to the nitrogen atom, or, with the o-position of the ring a, forms a heterocyclic structure of this type, and the second radical can also represent alkyl or alkenyl, or
  R and $R_1$ together with the nitrogen atom to which they are bonded form a 5-membered or 6-membered ring, and
  $An^\ominus$ represents an anion and the ring and the cyclic and acyclic substituents can carry non-ionic radicals,
and also to their preparation and use for dyeing, especially bulk dyeing, enscribing and printing paper and for dyeing, bulk dyeing and printing synthetic fibres, especially made of polyacrylonitrile and its copolymers, acid-modified polyesters or polyamides, and mixtures of these fibres with other fibres.

Preferred dyestuffs of the formula (I) are those of the formula

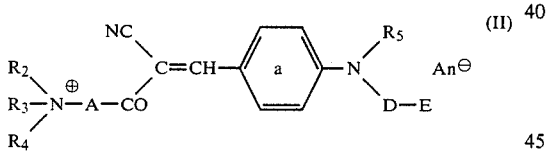

wherein
  $R_2$ denotes alkyl, aryl, aralkyl or cycloalkyl,
  $R_3$ denotes hydrogen or alkyl and
  $R_4$ denotes alkyl, or
  $R_2$, $R_3$ and $R_4$ together with the nitrogen atom to which they are bonded form a 5-membered or 6-membered ring, or
  $R_3$ and $R_4$ together with the nitrogen atom to which they are bonded form a 5-membered to 7-membered ring,
  $R_5$ denotes alkyl or —D—E or, with the o-position of ring a and the nitrogen atom to which it is bonded, forms an optionally benzocondensed 5-membered or 6-membered ring, or together with —D—E and the nitrogen atom forms a 5-membered to 6-membered ring,
  A denotes a bridge member,
  D denotes a direct bond or a bridge member and
  E denotes a 5-membered or 6-membered carbocyclic or heterocyclic ring, or
  —D—E, with the o-position of ring a and the nitrogen atom to which D is bonded, forms an optionally benzocondensed 5-membered or 6-membered ring or, if $R_5$ together with the o-position of the ring a forms a ring, represents alkyl, or
  —D—E represents a radical of the formula

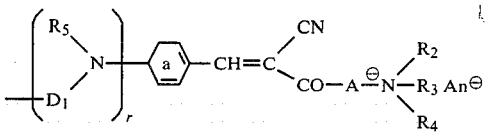

wherein
  $R_2$, $R_3$, $R_4$ and $R_5$ have the meanings indicated above but are independent of these,
  $D_1$ denotes a bridge member and r is 0 or 1, and—if r is 0—the o-positions of the two rings a can be linked to one another by a direct bond or via an oxygen or sulphur atom and—when r is 1—the radicals $R_5$, together with the two nitrogen atoms to which they are bonded and the bridge member $D_1$, can form a piperazine ring optionally substituted by alkyl,
  $An^\ominus$ represents an anion and the ring a and the cyclic and acyclic substituents can carry non-ionic radicals.

Alkyl in particular represents $C_1$–$C_4$-alkyl. Non-ionic substituents of the alkyl groups in the dyestuffs (I) and (II) are understood, for example, as halogen, $C_1$–$C_4$-alkoxy, phenoxy, benzyloxy, benzoyloxy, $C_1$–$C_4$-alkylsulphonylamino, benzenesulphonylamino, toluenesulphonylamino, $C_1$–$C_4$-alkylcarbonylamino, cyano or $C_1$–$C_4$-alkoxycarbonyl.

Alkenyl in particular represents $C_3$–$C_5$-alkenyl.

Preferred aralkyl groups are benzyl and α- or β-phenylethyl and preferred aryl groups are phenyl or naphthyl. The phenyl nuclei of these radicals can be substituted, for example by halogen, $C_1$–$C_4$-alkyl or $C_1$–$C_4$-alkoxy.

Preferred cycloalkyl radicals are cyclopentyl and cyclohexyl, which are optionally substituted by $C_1$–$C_4$-alkyl.

Non-ionic substituents of the ring a are, for example, $C_1$–$C_4$-alkyl, $C_1$–$C_4$-alkoxy or halogen.

Halogen is understood as fluorine, chlorine, or bromine, especially chlorine.

$R_2$, $R_3$ and $R_4$ can, for example, together with the nitrogen atom form a pyridine or imidazole ring which is optionally substituted by $C_1$–$C_4$-alkyl radicals, and $R_3$ and $R_4$ together with the nitrogen atom can form a pyrrolidine, piperidine, morpholine, thiomorpholine, piperazine or hexamethyleneimine ring which is optionally substituted by $C_1$–$C_4$-alkyl radicals.

$R_5$ can be cyclised together with the nitrogen atom and the ring a, for example to form a 2,3-dihydroindole, 1,2,3,4-tetrahydroquinoline or 2,3-dihydro-1,4-benzoxazine system, which can additionally be substituted in the heterocyclic ring by 1–4 $C_1$–$C_4$-alkyl radicals or a phenyl radical, or also form a carbazole, phenoxazine or phenthiazine ring by benzocondensation.

A in particular represents the bridge members

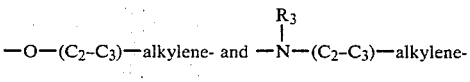

in which the hetero-atoms are linked to the CO group and the $C_2$- to $C_3$-alkylene chain can be substituted. Preferred substituents are phenyl and p-tolyl or $C_1$- to $C_4$-alkyl radicals, which, in turn, can be further substituted by $C_1$- to $C_4$-alkoxy, $C_1$-$C_4$-alkylcarbonyloxy, phenyl, phenoxy, benzoxy, phenylethoxy, benzoyloxy or allyloxy.

When E represents an isocyclic ring system $E_1$, D represents, for example, linking members of the formulae $$-C_mH_{2m}- \text{ and } -C_nH_{2n}-X_1-C_m-H_{2m}- \quad (-\!\!>\!\! E_1)$$

(V)        (VI)

and when E symbolises a heterocyclic ring system $E_2$, D represents the bridge members $$-C_pH_{2p}- \text{ and } -C_qH_{2q}-X_2-C_sH_{2s}- \quad (-\!\!>\!\! E_2)$$

(VII)        (VIII)

in which formulae
- m is 0–4,
- n is 1–4,
- p is 1–4,
- q is 1–4 and
- s is 0–4, whilst, for example, $X_1$ represents O, S, $SO_2$, COO, OCO, $NR_6$—CO, CO—$NR_6$, $NR_6$—$SO_2$, $SO_2$—$NR_6$, $NCOR_7$, NHCONH, OCO—NH, NH—COO, OCO—CH$_2$—S, OCO—CH=CH or OCO—CH$_2$O and $X_2$ represents O, S, $NR_6$—$SO_2$, $SO_2$—$NR_6$, COO, OCO, $NR_6$CO, $CONR_6$, $OCOCH_2S$ or OCO—CH$_2$—O, and $R_6$ = H, $CH_3$, $C_2H_5$, allyl or benzyl and
$R_7$ = H or $CH_3$.

$D_1$ represents, for example, a o-, m- or p-xylylene optionally substituted by chlorine or represents a bridge member of the formula $$-C_tH_{2t}[(Y_1-W)_u-Y_2-O_t-H_{2t}\!\!\mid_v \quad (IX)$$

wherein
- u and v denote 0 or 1 and
- t denotes 2–4 and—if $Y_1$ or $Y_2$ links to $C_tH_{2t}$ via a CO or $SO_2$ group—t can also be 1,
- $Y_1$ and $Y_2$ independently of one another have the same meanings as $X_1$ and, when u is 0, $Y_2$ also represents the groupings S—S, O—COO, $NR_6$, $NCOR_7$, $NR_6$—CO—$NR_6$, $NR_6$—CO—CO—$NR_6$, $NR_6$—$SO_2$—$NR_6$, CO—$NR_7$CO, CO—NH—NH—CO or O—CO—CO—O, and
- W represents an aliphatic, cycloaliphatic, aromatic or heterocyclic linking element which is customary in styryl dyestuff chemistry and has, for example, the following structure: $C_wH_{2w}$, in which w=2–10, vinylene, cycloalkylene, preferably 1,3- or 1,4-cyclohexylene, cycloalkanedialkylene, especially cyclohexane-1,2-, -1,3- and -1,4-dimethylene, or o-, m- and p-xylylene, o- and especially m- or p-phenylene which is optionally substituted by $C_1$- to $C_2$-alkyl, $C_1$- to $C_2$-alkoxy or halogen, preferably chlorine, 4,4'-diphenylene or 1,2-, 1,4- or 1,5-naphthylene, which are optionally substituted by methyl, methoxy or chlorine, and groupings of the type

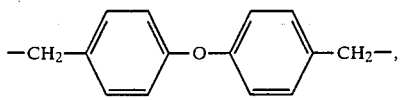

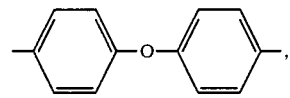

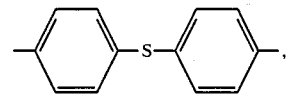

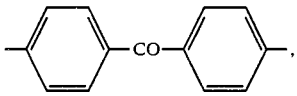

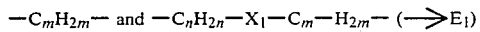

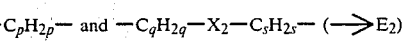

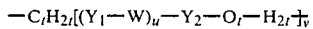

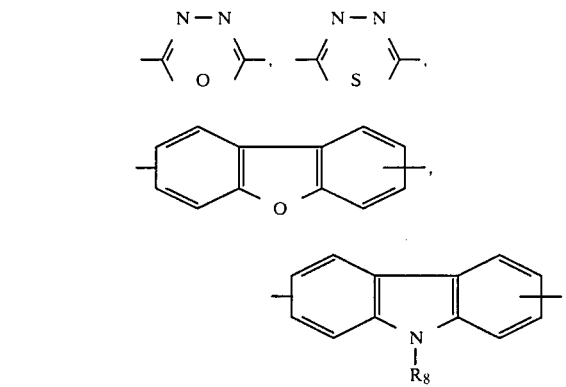

in which $R_8$ = H, methyl or ethyl,

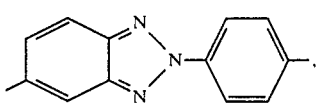

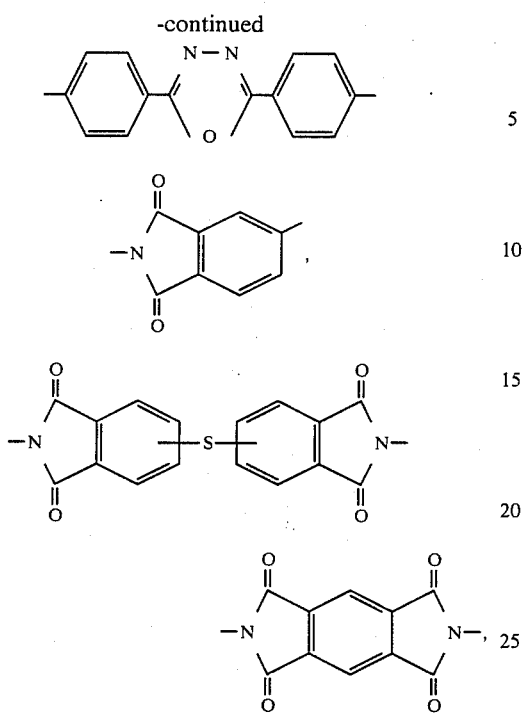

and the like, which are optionally substituted by 1–4 methyl, ethyl or chlorine.

Preferred cyclic radicals E belong to the benzene, naphthalene, cyclohexane, dibenzofurane, benzoxazole, benzimidazole, benzthiazole, succinimide, maleimide, phthalimide or sulphobenzimide series. These rings can be substituted by non-ionic radicals, such as, for example, $C_1$- to $C_{10}$-alkyl, $C_1$- to $C_6$-alkoxy, $C_1$- to $C_4$-alkoxycarbonyl, $C_1$- to $C_4$-alkylcarbonyloxy, cyclohexyl, cyclopentyl, bicyclo(2,2,1)hept-2-yl, benzoxalzol-2-yl, benzimidazol-2-yl, benzthiazol-2-yl, benztriazol-2-yl, phenyl, phenoxy, phenylmercapto, phenylsulphonyl, phenylsulphamido, phenylamidosulphonyl, benzoyl, benzyl, benzoyloxy, benzoxy, phenylethyl, 2-phenylisopropyl, benzoylamino, $C_1$- to $C_4$-alkylcarbonylamino and phenylcarbamoyl.

Possible anionic radicals $An^\ominus$ are the inorganic and organic anions customary for cationic dyestuffs (compare, for example, German Offenlegungsschriften (German Published Specifications) Nos. 2,128,326, pages 5–7, and 2,520,816, pages 4–6). Colourless anions which impart to the particular dyestuff the solubility characteristics desired for the intended dyeing process are preferred.

The anion is usually determined by the process of preparation and any purification of the cationic compounds which may be carried out. In general, the dyestuffs are in the form of halides, especially chlorides or bromides, or in the form of methosulphates, ethosulphates, sulphates, nitrates, chlorozincates, benzenesulphonates or toluenesulphonates or naphthalenesulphonates or in the form of acetates. These anions can be replaced by other anions in a known manner. In addition to this, there is also the possibility of precipitating the dyestuff cations with colourless anions which render the product sparingly soluble or with dyestuff anions.

Preferred dyestuffs are of the formula

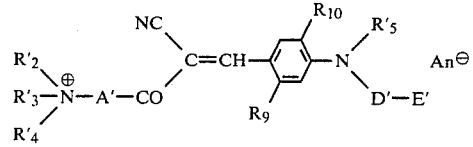

wherein $R'_2$ denotes $C_1$–$C_4$-alkyl, or benzyl or $\alpha$- or $\beta$-phenylethyl which are optionally substituted by 1–2 chlorine, $C_1$–$C_4$-alkyl or $C_1$–$C_4$-alkoxy groups, or cyclopentyl or cyclohexyl which are optionally substituted by 1–2 $C_1$–$C_4$-alkyl groups, $R'_3$ denotes hydrogen or $C_1$–$C_4$-alkyl and $R'_4$ denotes $C_1$–$C_4$-alkyl, or $R'_2$, $R'_3$ and $R'_4$ together with the nitrogen atom to which they are bonded form an imidazole or pyridine ring which is optionally substituted by 1 or 2 $C_1$–$C_4$-alkyl groups, or $R'_3$ and $R'_4$ together with the nitrogen atom to which they are bonded form a piperidine, pyrrolidine, morpholine, piperazine or hexamethyleneimine ring which is optionally substituted by 1–4 $C_1$–$C_4$-alkyl groups, $R'_5$ denotes $C_1$–$C_4$-alkyl, or phenyl, benzyl or $\alpha$- or $\beta$-phenylethyl which are optionally substituted by 1–2 chlorine, cyano, $C_1$–$C_4$-alkyl or $C_1$–$C_4$-alkoxy groups, $R_9$ denotes hydrogen, $C_1$–$C_4$-alkyl, $C_1$–$C_4$-alkoxy or chlorine and $R_{10}$ denotes hydrogen or $C_1$–$C_4$-alkoxy, or $R'_5$ and $R_{10}$ together with the benzene ring and the nitrogen atom to which $R'_5$ is bonded are constituents of an indoline, tetrahydroquinoline or 2,3-dihydro-1,4-benzoxazine ring system which is optionally substituted in the heterocyclic part by 1–4 $C_1$–$C_4$-alkyl groups or a phenyl radical, or are constituents of a carbazole, phenoxazine or phenthiazine system which is optionally substituted by 1–2 $C_1$–$C_4$-alkyl radicals, or $R'_5$ together with —D'—E' and the nitrogen atom forms a pyrrolidine, piperidine, morpholine, thiomorpholine, thiomorpholine-S-dioxide or piperazine ring which is optionally substituted by 1–2 $C_1$–$C_4$-alkyl groups, A' denotes a bridge member of the formula

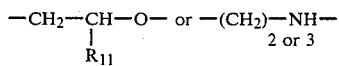

$R_{11}$ denotes hydrogen, $C_1$–$C_4$-alkyl or phenyl which is optionally substituted by 1–2 chlorines or $C_1$–$C_4$-alkyls, D' denotes a direct bond or a bridge member of the formulae (V), (VI), (VII) or (VIII) and E' denotes a phenyl radical which is optionally substituted by 1–4 $C_1$–$C_2$-alkyl groups, 1–2 $C_3$–$C_7$-alkyl, $C_1$–$C_4$-alkoxy or cyclopentyl groups or 1–5 chlorines or by a radical of the series $C_8$–$C_{12}$-alkyl, $C_1$–$C_4$-alkoxycarbonyl, $C_1$–$C_4$-alkylcarbonyloxy, $C_1$–$C_4$-alkylcarbonylamino, phenyl, phenoxy, phenylazo, phenylmercapto, phenylsulphonyl, phenylsulphamido, benzoyl, benzoyloxy, benzyl, benzoxy, phenylethyl, 2-phenylisopropyl, benzoylamino, phenylcarbamoyl, phenylsulphamoyl, cyclohexyl, bicyclo(2,2,1)hept-2-yl, benzoxazol-2-yl, benzimidazol-2-yl, benthiazol-2-yl or benztriazol-2-yl, a cyclopentyl or cyclohexyl radical which is optionally substituted by 1-2 $C_1$-$C_4$-alkyl groups, an α- or β-naphthyl group which is optionally substituted by 1-3 $C_1$-$C_2$-alkyls, 1-2 $C_3$-$C_8$-alkyls, $C_1$-$C_4$-alkoxys, cyclopentyls or chlorines or a radical from the series $C_1$-$C_4$-alkoxycarbonyl, $C_1$-$C_4$-alkylcarbonyloxy, $C_1$-$C_4$-alkylcarbonylamino, benzoylamino, benzyloxy, benzoxy, phenoxy, benzoyl, phenyl, benzyl, benzoxazol-2-yl, benzimidazol-2-yl, benzthiazol-2-yl, benztriazol-2-yl or 2-phenylisopropyl, a dibenzofurane, dibenzthiophene, benzoxazol-2-yl, benzthiazol-2-yl or benzimidazol-2-yl ring system which is optionally substituted by $C_1$-$C_2$-alkyl, $C_1$-$C_2$-alkoxy or chlorine, or a radical of the formula

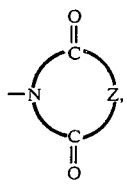

wherein Z represents

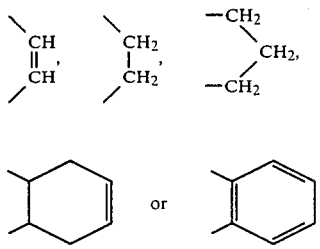

or a ring of the structure

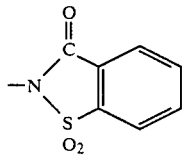

which are optionally substituted by 1-2 $C_1$-$C_2$-alkyl radicals and in the phenyl nucleus also by 1-2 chlorine atoms, and if $R'_5$ and $R'_{10}$ are cyclised with one another —D'—E' also represents $C_1$-$C_4$-alkyl, or —D'—E' represents a $C_2$-$C_3$-alkylene chain which links the nitrogen atom and the o'-position of the 1,4-phenylene ring to give an indoline or tetrahydroquinoline ring system and is optionally substituted by 1-3 methyl groups, or —D'—E' denotes a radical of the formula

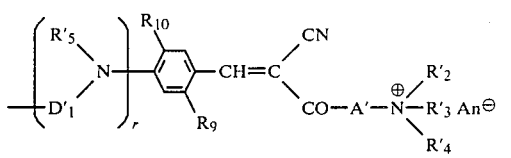

wherein $R'_2$, $R'_3$, $R'_4$, $R'_5$, $R_9$, $R_{10}$ and A', independently of the second chromophoric part of the molecule which links to $D'_1$, have the meanings indicated above, r represents 0 or 1 and, when r=0, the two radicals $R_{10}$ conjointly form a direct bond, an oxygen bridge or a sulphur bridge and—if r is 1—the two radicals $R'_5$, together with the two nitrogen atoms to which they are bonded and the bridge member $D'_1$, form a piperazine ring, $D'_1$ represents o-, m- or p-xylylene which is optionally substituted by 1-2 chlorines or represents a bridge member of the formula (IX) and $An^\ominus$ represents an anion, and wherein the abovementioned alkyl radicals can be substituted by 1-2 chlorine, cyano, $C_1$-$C_4$-alkoxy, phenoxy, naphthoxy, benzoyloxy, allyloxy, $C_1$-$C_4$-alkylcarbonyloxy or $C_1$-$C_4$-alkoxycarbonyl grops, and the phenyl groups, in turn, can be substituted by 1-2 chlorine, cyano, $C_1$-$C_4$-alkyl or $C_1$-$C_4$-alkoxy groups.

Particularly preferred dyestuffs correspond to the formula

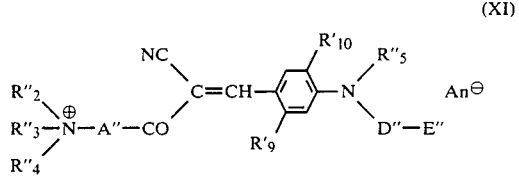

(XI)

wherein $R''_2$ denotes methyl, ethyl or benzyl, β-phenylethyl, 2-benzoxyethyl or 2-phenoxyethyl substituted by one chlorine or methyl, or cyclohexyl, $R''HD 3$ denotes methyl or ethyl and $R''_4$ denotes methyl or ethyl, or $R''_2$, $R''_3$ and $R''_4$ together with the nitrogen atom to which they are bonded form a pyridine ring which is optionally substituted by 1-2 methyl or ethyl radicals, or $R''_3$ and $R''_4$ together with the nitrogen atom to which they are bonded form a piperidine, pyrrolidine or morpholine ring or an optionally N-methylated or N-ethylated piperazine ring, $R'''_5$ designates $C_1$-$C_4$-alkyl which is optionally substituted by one chlorine, cyano, acetoxy, phenyl, benzoxy, benzoyloxy or phenoxy, or a phenyl radical, it being possible for the phenyl nuclei to be substituted by a chlorine atom or a methyl or ethyl radical, $R'_9$ denotes hydrogen, methyl, ethyl, methoxy, ethoxy or chlorine and $R'_{10}$ denotes hydrogen, methoxy or ethoxy, or $R''_5$ and $R'_{10}$ together with the nitrogen atom and the benzene nucleus to which they are bonded form an indoline or tetrahydroquinoline ring system, which is optionally substituted in the heterocyclic part by 1-3 methyl groups, or a carbazole, phenoxazine or phenthiazine ring, which is optionally substituted by 1-2 methyl groups, A" denotes a bridge member of the formula

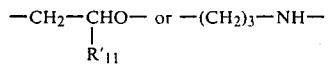

and

R'₁₁ denotes hydrogen, methyl, ethyl, phenyl, p-tolyl or methyl which is substituted by $C_1$-$C_4$-alkoxy, phenoxy, benzoxy, phenylethoxy, allyloxy, benzoyloxy or acetoxy, D''—when E'' represents an isocyclic ring system—designates the bridge members $$-C_mH_{2m}- \text{ or } -C_nH_{2n}-X'_1-C_mH_{2m}- \quad (-\!\!\!>\!\!E'')$$

(V)  (VIa)

wherein m = 0–4, n = 2–4 and—if $X'_1$ links to $C_nH_{2n}$ via a CO or $SO_2$ functional group—can also be 1 and $X'_1$ represents O, S, $SO_2$, COO, OCO, $NR'_6$—CO, CO—$NR'_6$, $NR'_6$—$SO_2$, $SO_2$—$NR'_6$, N—CO—$CH_3$, NH—CO—NH, O—CO—NH, O—CO—$CH_2$—O or $OCOCH_2S$ and $R'_6$ is H, $CH_3$, $C_2H_5$ or benzyl, and D''—when E'' represents a heterocyclic ring system—designates the bridge members $$-C_pH_{2p}- \text{ or } -C_qH_{2q}-X'_2-C_sH_{2s}- \quad (-\!\!\!>\!\!E'')$$

(VII)  (VIIIa)

wherein p = 1–4, q = 2–4 and—if $X'_2$ links to $C_qH_{2q}$ via a CO or $SO_2$ functional group—can also be 1, s is 0–4 and $X'_2$ is O, S, $NR'_6SO_2$, $SO_2$—$NR'_6$, COO, OCO, NHCO or CONH and E'' denote a phenyl radical which is optionally substituted by 1–4 methyls, 1–2 $C_2$-$C_4$-alkyls or $C_1$-$C_4$-alkoxys or 1–5 chlorine radicals or by a radical from the series cyclopentyl, cyclohexyl, $C_5$-$C_8$-alkyl, $C_1$-$C_4$-alkoxycarbonyl, $C_1$-$C_4$-alkylcarbonyloxy, $C_1$-$C_4$-alkylcarbonylamino, phenyl, phenoxy, phenylsulphonyl, phenylsulphamido, benzoyl, benzoyloxy, benzyl, benzoxy, phenylethyl, 2-phenylisopropyl, benzamido, phenylcarbamoyl, phenylsulphamoyl, benzoxazol-2-yl, benzimidazol-2-yl, benzthiazol-2-yl or benztriazol-2-yl, a cyclohexyl radical which is optionally substituted by 1 methyl, an α- or β-naphthyl group which is optionally substituted by 1–2 methyls, ethyls, methoxys, ethoxys or chlorines or by a radical from the series $C_1$-$C_4$-alkoxycarbonyl, $C_1$-$C_4$-alkylcarbonyloxy, $C_1$-$C_4$-alkylcarbonylamino, benzoylamino, benzoyloxy, benzoxy, benzoyl, benzyl or benzoxazol-2-yl, a dibenzofurane, benzoxazol-2-yl, benzthiazol-2-yl or benzimidazol-2-yl ring system which is optionally substituted by 1–2 methyls, ethyls, methoxys, ethoxys or chlorines, or a heterocyclic ring which is bonded to the bridge member $D'' = C_pH_{2p}$ and is of the formula

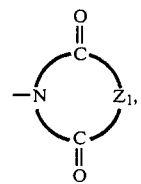

wherein $Z_1$ represents —CH=CH—, —$CH_2$—$CH_2$— or o-phenylene, or of the formula

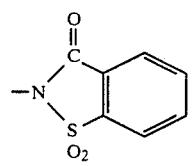

in which the o-phenylene nuclei are optionally substituted by 1–2 $C_1$-$C_2$-alkyls or chlorine atoms, —D''—E''— if R''₅ and R'₁₀ are cyclised—also represents $C_1$-$C_4$-alkyl, $C_1$-$C_2$-alkoxy-$C_1$-$C_4$-alkyl, cyanoethyl, $C_1$-$C_2$-alkoxycarbonyl-$C_2$-$C_3$-alkyl and chloro-$C_1$-$C_3$-alkyl, or —D''—E''— represents an ethylene or propylene chain which links the nitrogen atom and the o'-position of the 1,4-phenylene ring to give an indoline or tetrahydroquinoline ring system, or —D''—E'' represents a radical of the formula

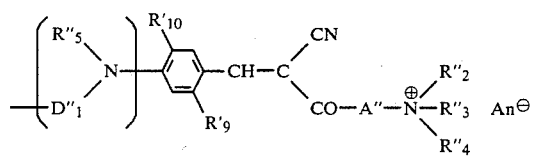

wherein

R''₂, R''₃, R''₄, An⊖, A'', R''₅, R'₉ and R'₁₀ have the meanings indicated for the second chromophoric part of the molecule (formula XI) which links to D''₁, r is 0 or 1 and—when r is 0—the two radicals R'₁₀ conjointly form a direct bond, an oxygen bridge or a sulphur bridge and—if r is 1—the two radicals R''₅ together with the two nitrogen atoms to which they are bonded and the bridge member D''₁ form a piperazine ring which is optionally substituted by methyl or ethyl, and D''₁ represents o-, m- or p-xylylene which is optionally substituted by 1–2 chlorines, or represents a bridge of the formula $$-C_{t'}H_{2t'}[(Y'_1-W')_u-Y'_2-C_{t'}H_{2t'}]_v-$$

wherein u and v denote 0 or 1, t' is 2 or 3 and—if the $Y'_1$ or $Y'_2$ bonded to $C_{t'}H_{2t'}$ is linked to this group via a CO or $SO_2$ group—t' can also be 1.

$Y'_1$ and $Y'_2$ independently of one another represent O, S, COO, OCO, $NR'_6$—CO, CO—$NR'_6$, $NR'_6$—$SO_2$, $SO_2$—$NR'_6$, OCO—NH, NH—COO, O—$CH_2$—COO, O—CO—$CH_2$—O and—if u is O—Y′₂ also represents the groupings S—S, O—CO—O, NR′₆, NR′₆—CO—NR′₆, CO—NR′₆—CO or NR′₆—SO₂—NR′₆, in which R′₆ is H, CH₃ or C₂H₅, and W′ represents an aliphatic, cycloaliphatic, aromatic or heterocyclic linking element which preferably has one of the following structures: $C_{w'}H_{2w'}$, in which w′ is 2-8, vinylene, 1,3- or 1,4-cyclohexanedimethylene, m- or p-xylylene, m- or p-phenylene or 1,4- or 1,5-naphthylene which are optionally substituted by 1-2 chlorines, $C_1$-$C_2$-alkyls or $C_1$-$C_2$-alkoxys, or bridges of the following structures

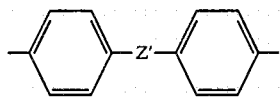

wherein

Z′ represents a direct bond, O, S, SO₂, CO, CH₂, C(CH₃)₂, SO₂—NR′₆ or CO—NR′₆,

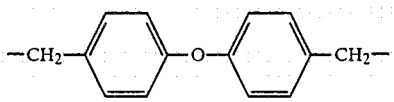

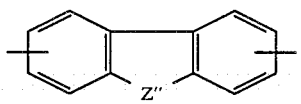

in which

Z″ = O or NR′₆,

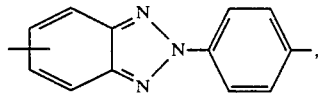

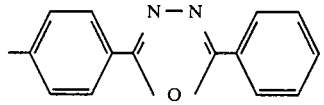

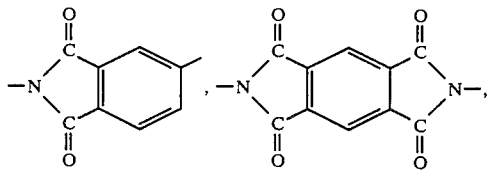

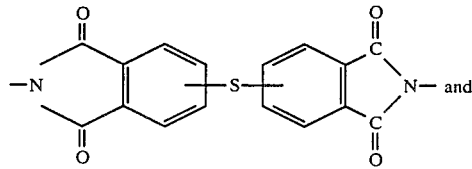

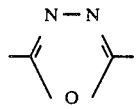

which are optionally substituted by 1-4 methyls, ethyls, methoxys or chlorines.

Amongst the dyestuffs of the formula (XI), the most valuable include (1) the dyestuffs of the general formula

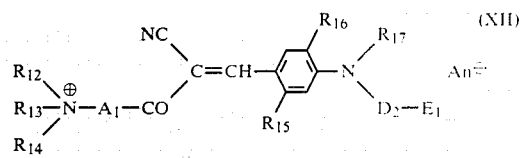

wherein

R₁₂ designates a methyl, ethyl, cyclohexyl, benzyl, β-phenylethyl or β-phenoxyethyl radical, R₁₃ designates a methyl or ethyl radical and R₁₄ designates a methyl or ethyl radical, or R₁₂, R₁₃ and R₁₄ together with the nitrogen atom to which they are bonded form a pyridine or picoline radical, or R₁₃ and R₁₄ together with the nitrogen atom to which they are bonded, form a pyrrolidine, piperidine or morpholine radical, A₁ denotes a bridge member which links via the heteroatom to the CO group and is of the formula

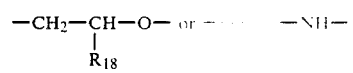

and

R₁₈ is H, CH₃, C₂H₅,
CH₂—O—C₆H₅, C

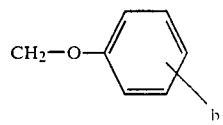

in which b is H, CH₃ or C₂H₅,

R₁₅ denotes hydrogen, methyl, ethyl, methoxy or ethoxy,

R₁₆ denotes hydrogen, methoxy or ethoxy,

R₁₇ denotes phenyl or a $C_1$-$C_4$-alkyl radical which is optionally substituted by one chlorine, cyano, phenyl, phenoxy, benzoxy, benzoyloxy or acetoxy, it being possible for the phenyl nuclei additionally to be substituted by one chlorine or methyl, D₂ denotes a direct bond or a bridge member of the formula CH₂, C₂H₄, CH₂—CH(CH₃), (CH₂)₃, CH₂CH(C₂H₅), CH₂—CH(C₆H₅), C₂H₄—X₃—(CH₂)₀ ₒᵣ ₁ or

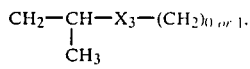

wherein

X₃ represents the hetero-atoms or groupings O, S, COO, OCO, CO—NR₁₉, NR₁₉—CO, SO₂—NR₁₉, NR₁₉—SO₂ (and R₁₉ is H, CH₃ or C₂H₅), OCONH, O—CO—CH₂—S or OCO—CH₂—O and E₁ links to X₃ or (CH₂), and $E_1$ denotes a phenyl radical which is optionally substituted by 1–2 $C_1$–$C_4$-alkyl or $C_1$–$C_4$-alkoxy radicals or 1–5 chlorines or by a radical from the series cyclopentyl, cyclohexyl, $C_5$–$C_8$-alkyl, $C_1$–$C_4$-alkoxycarbonyl, phenyl, phenoxy, phenylsulphonyl, phenylsulphamido, phenylsulphamoyl, benzoyl, benzyl, 2-phenylisopropyl, benzoxy, benzamido, phenylcarbamoyl, benzoxazol-2-yl, benzthiazol-2-yl or benztriazol-2-yl, a cyclohexyl radical which is optionally substituted by 1 methyl, an α- or β-naphthyl group which is optionally substituted by 1–2 methyls, ethyls, methoxys, ethoxys or chlorines or by a radical from the series $C_1$–$C_4$-alkoxycarbonyl, $C_1$–$C_4$-alkylcarbonyloxy, $C_1$–$C_4$-alkylcarbonylamino, benzoylamino, benzoyloxy, benzoxy, benzoyl or benzyl, or a dibenzofurane ring which is optionally substituted by 1–2 methyls, ethyls or chlorines, and $An^\ominus$ denotes an anion, (2) the dyestuffs of the general formula

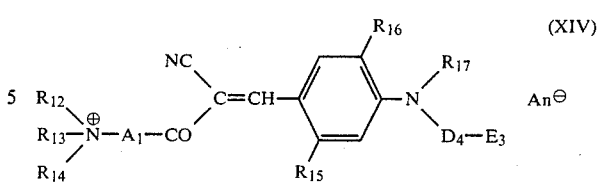

(XIII)

wherein $An^\ominus$, $R_{12}$, $R_{13}$, $R_{14}$, $A_1$, $R_{15}$, $R_{16}$ and $R_{17}$ have the indicated meanings, $D_3$ designates a bridge member of the formula $C_2H_4$, $CH_2CH(CH_3)$, $(CH_2)_3$, $CH_2CH(C_2H_5)$, $CH_2CH(C_6H_5)$, $C_2H_4X_4(CH_2)_{0 \text{ or } 1}$ or $$CH_2-\underset{\underset{CH_3}{|}}{CH}-X_4(CH_2)_{0 \text{ or } 1},$$

wherein $X_4$ represents the hetero-atoms or groupings O, S, O—CO, CO—$NR_{19}$, $NR_{19}$—CO, $SO_2$—$NR_{19}$, $NR_{19}$—$SO_2$, O—CO—$CH_2$—O or O—CO—$CH_2$—S and $E_2$ links to $X_4$ or $(CH_2)$, and $E_2$ designates a benzoxazol-2-yl, benzthiazol-2-yl or benzimidazol-2-yl ring system which is optionally substituted by 1–2 $C_1$–$C_2$-alkyls, $C_1$–$C_2$-alkoxys or chlorines, (3) the dyestuffs of the general formula

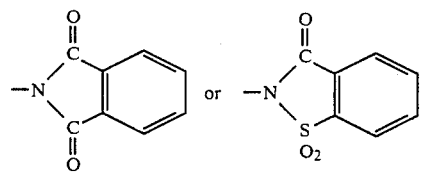

(XIV)

wherein $An^\ominus$, $R_{12}$, $R_{13}$, $R_{14}$, $A_1$, $R_{15}$, $R_{16}$ and $R_{17}$ have the indicated meanings, $D_4$ represents a bridge member of the formula $C_2H_4$,

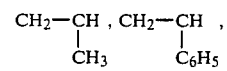

$CH_2$—$CH_2$—O—$CH_2$—$CH_2$ or $(CH_2)_3$ and $E_3$ represents a ring system of the formula

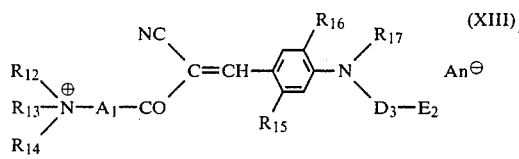

which is optionally substituted by 1–2 methyls or chlorines, (4) the dyestuffs of the general formula

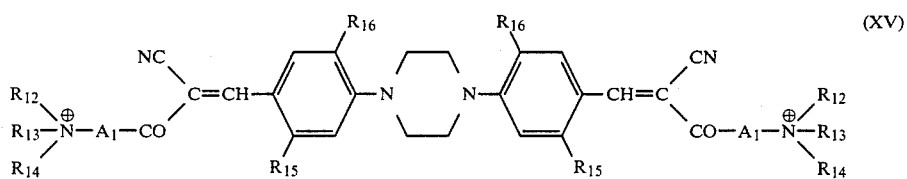

(XV)

$2.An^\ominus$ wherein $An^\ominus$, $R_{12}$, $R_{13}$, $R_{14}$, $A_1$, $R_{15}$ and $R_{16}$ have the meanings indicated above and the piperazine ring optionally contains 2 methyl substituents bonded to carbon, (5) the dyestuffs of the general formula

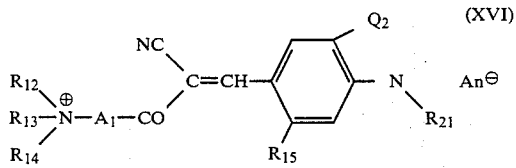

(XVI)

wherein $An^\ominus$, $R_{12}$, $R_{13}$, $R_{14}$, $A_1$ and $R_{15}$ have the above-mentioned meanings, $Q_2$ represents the cyclising members

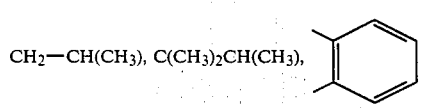

$CH_2$—$CH(CH_3)$, $C(CH_3)_2CH(CH_3)$,

-continued

CH$_2$—CH$_2$—CH(CH$_3$), CH(CH$_3$)—CH$_2$—C(CH$_3$)$_2$,

O—CH$_2$—CH$_2$, OCH$_2$—CH(CH$_3$), O—CH$_2$—CH(C$_6$H$_5$),

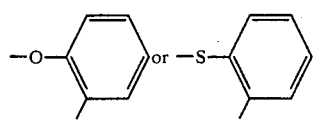

and

R$_{21}$ represents methyl, or ethyl or propyl which are optionally substituted by chlorine, cyano, methoxy or ethoxy, or represents one of the radicals —D$_2$E$_1$, —D$_3$E$_2$ or —D$_4$E$_3$, wherein D$_2$, D$_3$, D$_4$, E$_1$, E$_2$ and E$_3$ have the meanings defined above, (6) the dyestuffs of the general formula

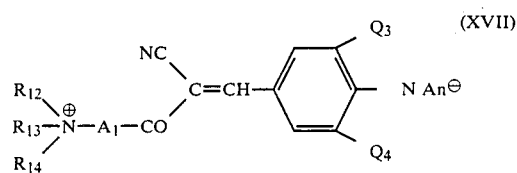
(XVII)

wherein

An$^\ominus$, R$_{12}$, R$_{13}$, R$_{14}$ and A$_1$ have the meanings already indicated and Q$_3$ and Q$_4$ independently of one another represent the cyclising members (CH$_2$)$_2$ or (CH$_2$)$_3$ and both the benzoid ring and Q$_3$ and Q$_4$ are optionally substituted by a methyl group, (7) the dyestuffs of the general formula

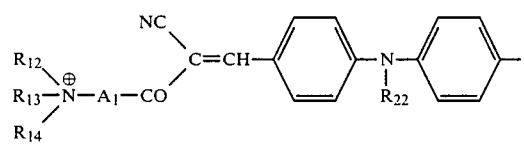
(XVIII)

wherein

An$^\ominus$, R$_{12}$, R$_{13}$, R$_{14}$ and A$_1$ have the meanings defined above and R$_{22}$ represents a methyl, ethyl, benzyl or β-chloroethyl group, (8) the dyestuffs of the general formula

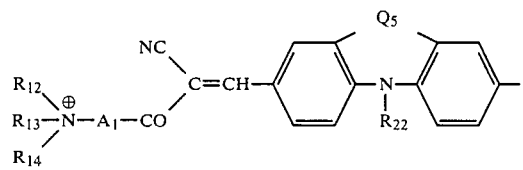
(XIX)

wherein

An$^\ominus$, R$_{12}$, R$_{13}$, R$_{14}$, A$_1$ and R$_{22}$ have the meanings already indicated and Q$_5$ represents a direct bond, a O bridge or a S bridge, (9) the dyestuffs of the general formula

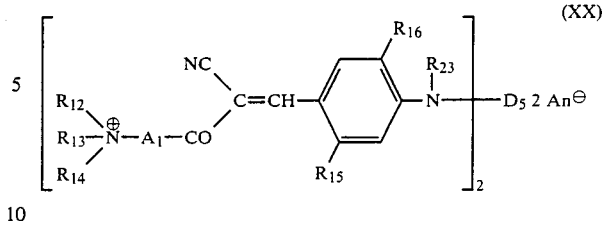
(XX)

wherein

An$^\ominus$, R$_{12}$, R$_{13}$, R$_{14}$, A$_1$, R$_{15}$ and R$_{16}$ have the meanings indicated above, R$_{23}$ represents a C$_1$–C$_4$-alkyl group which is optionally substituted by an acetoxy, cyano, phenyl or phenoxy group and D$_5$ represents (a) a C$_2$–C$_3$-alkylene, (b) a m- or p-xylylene, (c) a bridge member of the formula

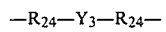
—R$_{24}$—Y$_3$—R$_{24}$— wherein

R$_{24}$=C$_2$–C$_3$-alkylene and

Y$_3$=O, S, SS, SO$_2$, NR$_{25}$ (and R$_{25}$ is H, CH$_3$ or C$_2$H$_5$), NH—CO—NH,

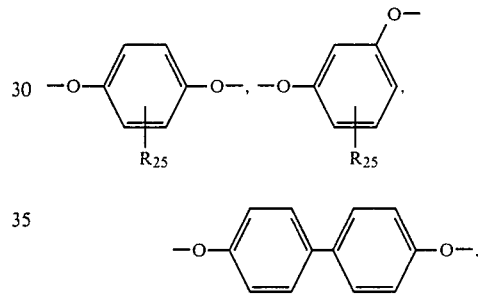

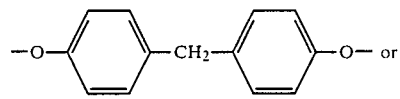—O— or

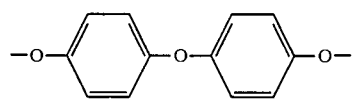

(d) a bridge member of the formula

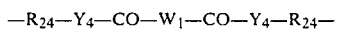
—R$_{24}$—Y$_4$—CO—W$_1$—CO—Y$_4$—R$_{24}$— wherein
R$_{24}$ has the indicated meaning,
Y$_4$ represents O, NH or N—CH$_3$ and
W$_1$ represents C$_1$-C$_6$-alkylene, —CH=CH—,

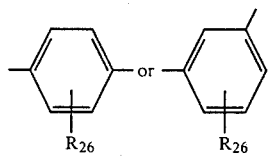

(and R$_{26}$ is H, CH$_3$, Cl or OCH$_3$), (e) a bridge member of the formula

—R$_{27}$—COY$_5$—W$_2$—Y$_5$CO—R$_{27}$— wherein
R$_{27}$ represents C$_1$-C$_3$-alkylene,
Y$_5$ represents O, NH or NCH$_3$ and
W$_2$ represents C$_2$-C$_8$-alkylene,

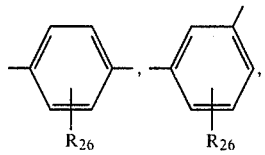

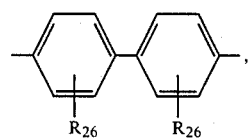

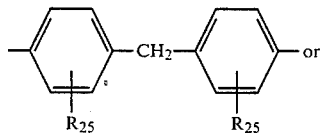

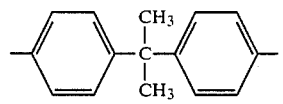

or (f) a bridge member of the formula

—R$_{24}$—OCONH—W$_2$—NHCOO—R$_{24}$— wherein
R$_{24}$ and W$_2$ have the meanings defined above, and
(10) the dyestuffs of the general formula wherein
An$^\ominus$, R$_{12}$, R$_{13}$, R$_{14}$, R$_{15}$, A$_1$, Q$_2$ and D$_5$ have the meanings indicated above.

Amongst the dyestuffs of the formula (XII), in turn, those wherein
R$_{13}$, R$_{14}$ and An$^\ominus$ have the indicated meaning and
R$_{12}$ denotes methyl, ethyl, cyclohexyl or benzyl,
R$_{12}$, R$_{13}$ and R$_{14}$ together with the nitrogen atom denote pyridine,
R$_{13}$ and R$_{14}$ together with the nitrogen atom denote piperidine,
A$_1$ denotes

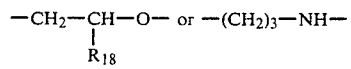

and
R$_{18}$ is H, CH$_3$ or C$_6$H$_5$,
R$_{15}$ denotes hydrogen or methyl,
R$_{16}$ denotes hydrogen,
R$_{17}$ denotes methyl or ethyl,
D$_2$ denotes CH$_2$ or (CH$_2$)$_2$ and
E$_1$ denotes phenyl which is optionally substituted by chlorine or methyl,
are to be singled out.

The new dyestuffs are prepared in a manner which is in itself known, by subjecting aldehydes of the formula

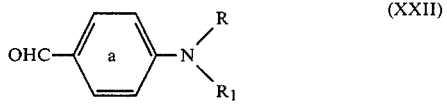

(XXII)

or their functional derivatives of the formula

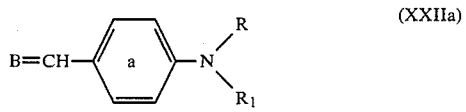

(XXIIa)

wherein
R, R$_1$ and ring a have the meanings indicated under formula (I) and
B represents NR$_{28}$ and
R$_{28}$ preferably designates a phenyl, sulphophenyl or carboxyphenyl radical,
to a condensation reaction with compounds of the formula

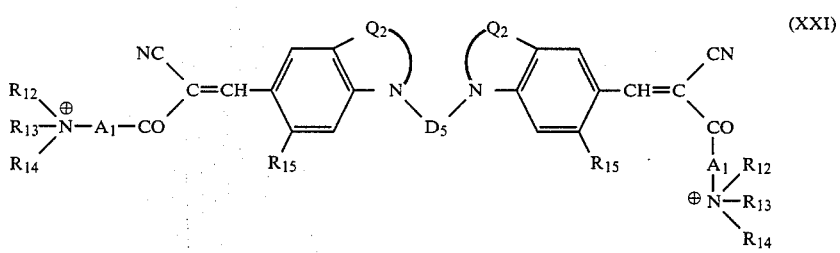

(XXI)

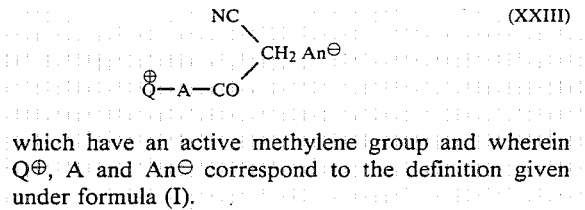

which have an active methylene group and wherein Q⊕, A and An⊖ correspond to the definition given under formula (I).

The condensation reactions are carried out at temperatures between 20° and 140° C., preferably in the range 50°–110° C., in an organic solvent. Suitable solvents are, for example, alcohols, such as methanol, ethanol, the propanols and butanols, and also benzyl alcohol, ethyl acetate, methyl benzoate, formic acid, acetic acid, acetic anhydride, dimethylformamide, dimethylacetamide, tetramethylurea, acetonitrile, benzonitril and others. Basic catalysts, such as, for example, triethylamine, pyridine, piperidine, N-ethylpiperidine, N-methylmorpholine, alkali metal carbonates, alkali metal acetates and acetates of inorganic or organic nitrogen bases, such as, for example, ammonium acetate or piperidine acetate, can be added in order to accelerate the Knoevenagel condensation reaction.

The aldehydes of the formula (XXII) are mostly known or can be obtained by conventional methods by subjecting the corresponding tertiary aromatic amines to formylation and, for this purpose, in particular the reactions according to Vilsmeier and Haack or according to Duff (Journal of the Chemical Society (London) 1952, pages 1159–1164, advantageously in the embodiment according to German Patent Specification No. 1,206,879) are used. In special cases, the bisaldehydes (XXII) are advantageously prepared by linking two molecules of a N-hydroxyalkyl-4-aminobenzaldehyde by means of bifunctional compounds, for example by means of dicarboxylic acid chlorides or diisocyanates. A process which proves useful for the preparation of the requisite N-hydroxyalkyl-4-aminobenzaldehydes is that indicated in U.S. Pat. No. 2,583,551 (Example 17), which leads to the corresponding aldimines of the formula (XXIIa).

Suitable aldehydes (XXII) are used, inter alia, in the following Patent Specifications and Auslegeschriften and Offenlegungsschriften (Published Specifications); their preparation has frequently been described: U.S. Pat. Nos. 2,583,551, 2,766,233, 2,850,520, 3,240,783, 3,247,211, 3,349,098, 3,386,491, 3,453,270, 3,453,280, 3,483,218, 3,504,010, 3,553,245, 3,595,863, 3,597,434, 3,631,049, 3,635,957, 3,728,374, 3,756,778, 3,844,715, 3,855,215, 3,869,495, 3,891,691, 3,909,198, 3,927,063 and 3,948,938, German Auslegeschriften (German Published Specifications) Nos. 1,067,156, 1,245,005, 1,569,686 and 1,813,363, German Offenlegungsschriften (German Published Specification) Nos. 1,569,674, 1,569,678, 1,569,731, 1,959,706, 2,017,919, 2,042,498, 2,058,405, 2,114,574, 2,147,810, 2,147,811, 2,300,034, 2,316,766, 2,344,075, 2,409,464, 2,445,583, 2,446,759, 2,447,229 and 2,542,376, Swiss Patent Specification Nos. 435,517, 492,758, 493,596, 505,875, 505,876 and 516,628, British Patent Specification Nos. 1,027,026, 1,110,714, 1,257,926 and 1,263,257, Belgian Patent Specification Nos. 665,660, 703,181, 706,612 and 835,291, Netherlands Patent Specification No. 64.14,819, Japanese Patent Specification Nos. 40.28,253 and 49.23,224 (=U.S. patent application Ser. No. 248,483) and Japanese Patent Application Nos. 70/28,026, 71/23,508 and 71/29,466.

Cationic compounds of the formula (XXIII) containing an active methylene group which are suitable for the preparation of the dyestuffs according to the invention are, for example, those which follow (omitting An⊖, which in this context is preferably a methosulphate, ethosulphate, chloride, bromide, iodide, sulphate or acetate anion):

NC—CH$_2$—COO—C$_2$H$_4$—$\overset{\oplus}{\text{N}}$(CH$_3$)$_2$N,

NC—CH$_2$—COO—C$_2$H$_4$—$\overset{\oplus}{\text{N}}$(CH$_3$)$_3$,

NC—CH$_2$—COO—C$_2$H$_4$—$\overset{\oplus}{\text{N}}$(CH$_3$)$_2$C$_2$H$_5$,

NC—CH$_2$—COO—C$_2$H$_4$—$\overset{\oplus}{\text{N}}$(C$_2$H$_5$)$_2$H,

NC—CH$_2$—COO—C$_2$H$_4$—$\overset{\oplus}{\text{N}}$(C$_2$H$_5$)$_2$CH$_3$,

NC—CH$_2$—COO—C$_2$H$_4$—$\overset{\oplus}{\text{N}}$(C$_2$H$_5$)$_3$,

NC—CH$_2$—COO—C$_2$H$_4$—$\overset{\oplus}{\text{N}}$(C$_3$H$_7$)$_2$CH$_3$,

NC—CH$_2$—COO—C$_2$H$_4$—$\overset{\oplus}{\text{N}}$(CH$_3$)$_2$C$_4$H$_9$,

NC—CH$_2$—COO—C$_2$H$_4$—$\overset{\oplus}{\text{N}}$(CH$_3$)$_2$C$_6$H$_5$,

NC—CH$_2$—COO—C$_2$H$_4$—$\overset{\oplus}{\text{N}}$(CH$_3$)$_2$C$_6$H$_{11}$,

NC—CH$_2$—COO—C$_2$H$_4$—$\overset{\oplus}{\text{N}}$(CH$_3$)$_2$CH$_2$C$_6$H$_5$, NC—CH$_2$—CO—NH—C$_2$H$_4$—$\overset{\oplus}{\text{N}}$(CH$_3$)$_3$, NC—CH$_2$—CO—NH(CH$_2$)$_3$$\overset{\oplus}{\text{N}}$(CH$_3$)$_3$, NC—CH$_2$—CO—NH—C$_2$H$_4$—$\overset{\oplus}{\text{N}}$(C$_2$H$_5$)$_3$, NC—CH$_2$—CO—NH(CH$_2$)$_3$$\overset{\oplus}{\text{N}}$(C$_2$H$_5$)$_3$,

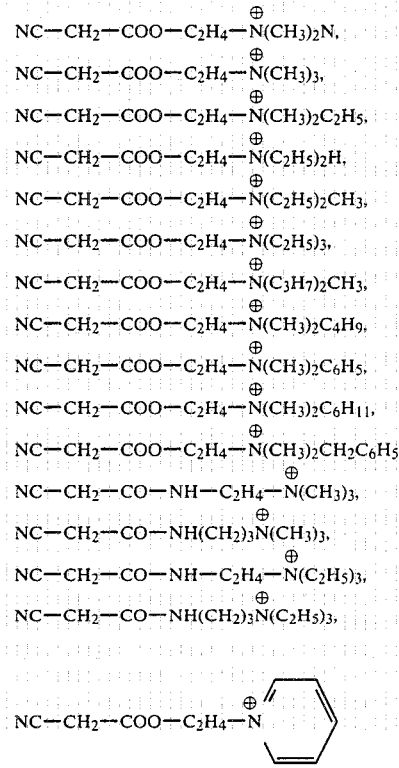

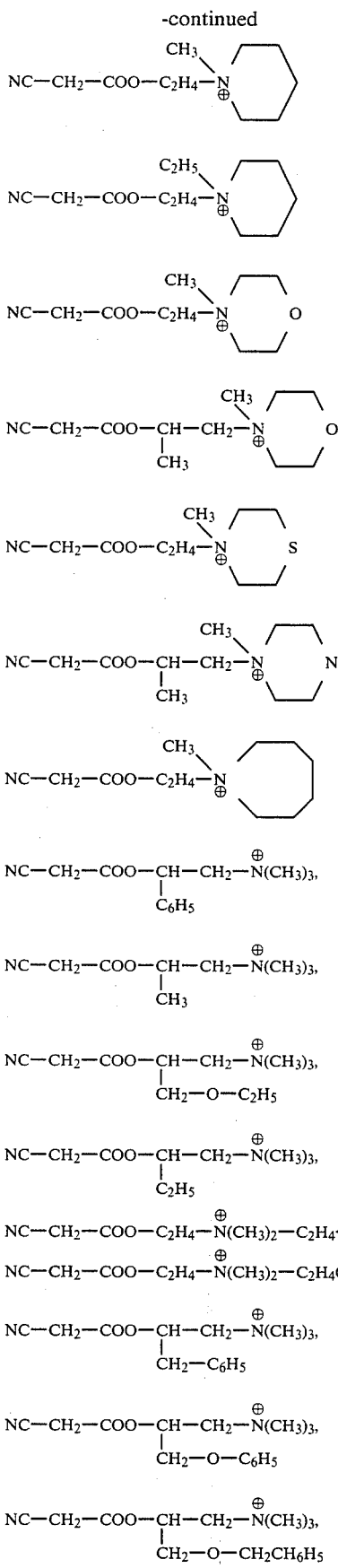

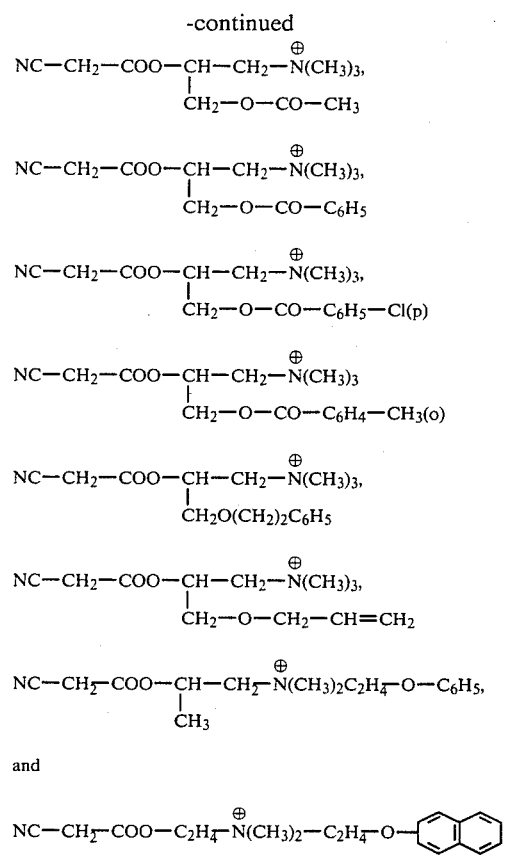

and numerous others which are obtained in a manner which is in itself known by esterification of the corresponding cationic alcohols with cyanoacetic acid, transesterification of cyanoacetic acid methyl ester or ethyl ester with hydroxyalkylamines and subsequent quaternisation of the reaction product or the formation of an amide from cyanoacetic acid methyl ester or ethyl ester and aminoalkylamines and subsequent quaternisation of the reaction product.

The dyestuffs according to the invention are suitable for dyeing, printing and bulk dyeing materials which consist in the main or entirely of polyacrylonitrile or its copolymers with other vinyl monomers, such as vinylidene cyanide, vinylidene chloride, vinyl chloride, vinyl acetate, vinyl alcohol, acrylates or methacrylates, or of acid-modified polyesters or polyamides. The resulting dyeings and prints, above all on polyacrylonitrile, are distinguished by good general fastness properties, especially by high fastness to light, wet processing and perspiration, by a high affinity for the fibre and by a high pH-stability.

The dyestuffs are also suitable for the other known applications of cationic dyestuffs, such as, for example, the dyeing and printing of cellulose acetate, coir fibres, jute, sisal, silk and tannin-mordanted cotton and leather, for the preparation of pastes for ballpoint pens, inter alia, by precipitation with anionic dyestuffs, and of stamp inks and for use in rubber printing.

The outstanding suitability of the dyestuffs according to the invention for the bulk dyeing of sized and unsized papers, with which particularly high affinities for lignin-containing (wood pulp-containing) paper pulps are found, is to be singled out in particular. Some of the new dyestuffs are additionally distinguished by very high affinities for lignin-free paper pulps (for example bleached sulphite pulp), so that paper pulps of this type can be dyed with considerably reduced staining of the waste water.

The dyestuffs possess in the main very good solubilities in water and polar organic solvents, so that they are suitable for the preparation of stable highly concentrated solutions. They are readily decolorised by reducing agents, such as dithionites or sulphites, so that recycling of waste papers dyed with these dyestuffs is possible without difficulty.

In the examples which follow, parts are understood to be parts by weight unless expressly stated otherwise and the temperatures are given in degrees centigrade.

EXAMPLE 1

After adding a few drops of piperidine as the catalyst, a solution of 13.4 parts of N-ethyl-N-(β-phenoxyethyl)-4-aminobenzaldehyde and 14.1 parts of cyanoacetic acid choline ester methosulphate in 20 parts by volume of dimethylformamide is warmed to 80°–90° C. for 4 hours, whilst stirring. The solvent is then distilled off completely under a waterpump vacuum and about 25 parts of a resinous residue are obtained, from which 19.3 parts of the pure dyestuff of the formula

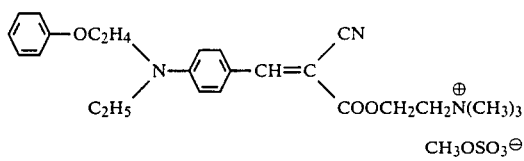

with a melting point of 127°–131° C. are obtained by crystallisation from isopropanol.

$\lambda_{max}$ (H$_2$O) = 440 nm.

By means of the procedure of Example 2, the dyestuff is also obtained in a stable, highly concentrated liquid formulation.

The cyanoacetic acid choline ester methosulphate required for the preparation of the dyestuff is advantageously obtained in the following way:

247.5 parts of cyanoacetic acid methyl ester and 267 parts of dimethylaminoethanol, to which 800 parts by volume of hexane are added, are heated to the boil and the methanol liberated during the trans-esterification is removed from the reaction medium through a column as an azeotropic mixture with hexane. During this process, the hexane distilled off is appropriately continuously replenished by the dropwise addition of fresh hexane. After about 6–8 hours the transesterification is virtually complete (thin layer chromatography, detection with dimethylaminobenzaldehyde). The hexane and excess dimethylaminoethanol are removed by distillation, the latter compound being removed in vacuo, and the oily residue is immediately subjected to quaternisation, as follows: all of the oil is taken up in 1,000 parts by volume of chloroform, 380 parts of dimethyl sulphate are added dropwise in the course of about ¾ hour, whilst cooling, and the mixture is subsequently stirred for 1 hour at 50° C. The quaternary salt which has crystallised out is filtered off, digested for 1 hour in 500 parts by volume of isopropanol, filtered off again, washed with isopropanol and dried in vacuo at 50° C.

Yield: 468 parts of cyanoacetic acid choline ester methosulphate.

Melting point: 125°–126° C.

Catalysis of the trans-esterification by the addition of titanic acid ortho esters, which is recommended in the literature, results in no advantages. As is evident from the list in the general section and from the examples which follow, a large number of cationic cyanoacetates are obtained correspondingly when other N-hydroxyalkylamines, such as 3-dimethylaminopropanol, 2-diethylaminoethanol, 3-dimethylaminoisopropanol and numerous others, are used and by variation of the alkylating agent, for example using diethyl sulphate, allyl chloride, benzyl chloride, β-bromoethyl phenyl ether, phenylethyl bromide and others.

The dyestuff obtained above dyes ®Dralon (polyacrylonitrile) in brilliant greenish-tinged yellow shades which have high fastness to light coupled with an outstanding general level of fastness properties. It is also suitable for the preparation of stamp inks and pastes for ballpoint pens and for rubber printing.

When it is used for dyeing wood pulp-containing paper pulps, a surprising affinity for the fibre and slight staining of the waste water are observed. The dyed papers have strongly greenish-tinged yellow shades of high clarity.

EXAMPLE 2

A solution of 5.1 parts of cyanoacetic acid in 18.3 parts of acetic anhydride is stirred for 1 hour at 50° C. and after adding 15.1 parts of N-benzyl-N-β-hydroxyethyl-dimethylammonium chloride the mixture is warmed to 30° C. for 1 hour, 14.3 parts of N-benzyl-N-ethyl-4-aminobenzaldehyde (diluted with 5 parts of glacial acetic acid) are then added and the resulting mixture is stirred for 6 hours at 80° C. 7 parts of water are added in order to decompose the remaining acetic anhydride, the mixture is further stirred briefly and about 62 parts of dyestuff solution containing about 30% of the dyestuff of the formula

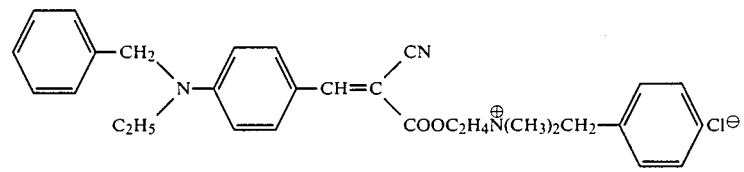

are obtained.

The solution ($\lambda_{max}$ in H$_2$O = 440 nm) is outstandingly suitable for dyeing ®Dralon (polyacrylonitrile) and acid-modified polyesters and also for bulk dyeing lignin-containing paper pulps in clear, strongly greenish-tinged yellow shades.

Further, dyestuffs, according to the invention, of the formula

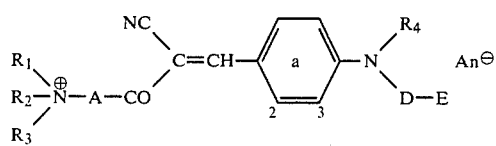

which have comparable, outstanding coloristic properties when dyeing the abovementioned materials, especially polyacrylonitrile (®Dralon), acid-modified polyesters (for example ®Dacron 64) and polyamides, and when bulk dyeing sized and unsized papers, are obtained analogously to the above examples by using appropriate starting materials.

A selection, including the colour shade of bulk-dyed paper, is listed in the tables which follow.

TABLE 1

| Example No. | $R_1$ | $R_2$ | $R_3$ | A | Substituents in ring a | $R_4$ | D | E | Colour shade of paper on bulk dyeing |
|---|---|---|---|---|---|---|---|---|---|
| 3 | $CH_3$ | $CH_3$ | $CH_3$ | $C_2H_4O$ | — | $CH_2C_6H_5$ | $CH_2$ | $C_6H_5$ | greenish-tinged yellow |
| 4 | " | " | " | " | — | $C_2H_5$ | " | " | " |
| 5 | " | " | " | " | 2-$CH_3$ | $CH_3$ | " | " | " |
| 6 | " | " | " | " | — | $C_2H_4OCH_3$ | " | " | " |
| 7 | " | " | " | " | — | $C_2H_4OOOC_6H_5$ | " | " | " |
| 8 | " | " | " | " | 2-$CH_3$ | $C_2H_4CN$ | " | " | " |
| 9 | " | " | " | " | — | $C_2H_4OO_2C_2H_5$ | " | " | " |
| 10 | $C_2H_5$ | $C_2H_5$ | " | " | — | $CH_3$ | $C_2H_4O$ | " | " |
| 11 | \multicolumn{3}{l}{$-CH-CH-CH-CH-CH-$} | " | 2-$CH_3$ | $C_2H_5$ | " | " | " |
| 11a | | | | " | — | " | $CH_2$ | " | " |
| 12 | \multicolumn{3}{l}{$-CH-CH-N-CH=$ / $CH_3$} | " | — | $C_4H_9$ | $C_2H_4O$ | " | " |
| 13 | $CH_3$ | $CH_3$ | $CH_3$ | " | — | $C_2H_5$ | " | p-$C_6H_4C(CH_3)_3$ | " |
| 14 | " | " | " | " | 2-$CH_3$ | " | " | $C_6Cl_5$ | " |
| 15 | " | " | " | " | 2-$CH_3$ | " | " | $C_6H_4Cl(p)$ | " |
| 16 | " | " | " | " | 2-$OCH_3$ | " | $C_2H_4OCO$ | $C_6H_4COOCH_3(p)$ | " |
| 17 | " | " | " | " | 2,5-N—$OCH_3$ | " | $C_2H_4O$ | $C_6H_4OC_2H_5(p)$ | " |
| 18 | " | " | " | " | 2-$CH_3$ | $CH_3$ | $CH_2$ | $C_6H_5$ | " |
| 19 | " | " | " | " | — | $C_2H_5$ | " | $C_6H_4Cl(p)$ | " |
| 20 | " | " | " | " | — | $CH_3$ | $(CH_2)_2$ | $C_6H_5$ | " |
| 21 | $CH_2C_6H_5$ | " | " | " | — | " | " | " | " |
| 22 | $C_6H_{11}$ | " | " | " | — | $C_2H_5$ | " | " | " |
| 23 | $CH_3$ | $C_2H_5$ | $C_2H_5$ | " | — | $C_2H_4C_6H_5$ | " | " | " |
| 24 | " | $CH_3$ | $CH_3$ | " | 2-$CH_3$ | $C_2H_4Cl$ | " | " | " |
| 25 | " | " | " | " | " | $C_2H_4OOOCH_3$ | " | " | " |
| 26 | " | " | " | $CH_2CHO$ / $CH_3$ | | | | | |
| 27 | " | " | " | $C_2H_4O$ | $C_2H_4OC_6H_5$ | $C_2H_4O$ | " | " | " |
| 28 | " | " | " | " | 2-$CH_3$ | $CH_2CHCl$ / $CH_3$ | $C_2H_4$ | " | " |
| 29 | " | " | " | $(CH_2)_3O$ | — | $C_2H_5$ | $CH_2$ | " | " |
| 30 | " | " | " | $(CH_2)_2NH$ | — | " | " | " | " |
| 31 | " | " | " | $(CH_2)_3NH$ | — | " | " | " | " |
| 32 | " | " | " | $(CH_2)_3NCH_3$ | — | " | " | " | " |
| 33 | " | " | " | $C_2H_4O$ | — | " | $C_2H_4OOONH$ | " | " |
| 34 | " | " | " | " | — | " | $C_2H_4OOONH$ | $C_6H_{11}$ | " |
| 35 | " | " | " | " | — | $CH_3$ | $CH_2CHO$ / $C_6H_5$ | $C_6H_5$ | " |

TABLE 1-continued

| Example No. | R₁ | R₂ | R₃ | A | Substituents in ring a | R₄ | D | E | Colour shade of paper on bulk dyeing |
|---|---|---|---|---|---|---|---|---|---|
| 36 | " | " | " | " | — | " | CH₂CHOCONH<br>\|<br>C₆H₅ | " | " |
| 37 | " | " | " | " | — | C₂H₅ | CH₂CHCOO<br>\|<br>CH₂OC₂H₅ | C₆H₄OCH₃(p) | " |
| 38 | " | " | " | " | 2-Cl | CH₃ | CH₂ | C₆H₅ | " |
| 39 | " | " | " | " | 2-CH₃ | C₂H₅ | C₂H₄O | C₆H₄Br(p) | " |
| 40 | " | " | " | " | " | C₂H₄C₆H₅ | C₂H₄OOONH | C₂H₅ | " |
| 41 | " | " | " | " | " | " | C₂H₄O | C₆H₄C(CH₃)₂CH₂C<br>(p) (H₃C)₃ | " |
| 42 | " | " | " | " | " | C₂H₅ | " | C₆H₄—C₅H₉(p) | " |
| 43 | " | " | " | " | " | " | " | C₆H₄—C₆H₁₁(p) | " |
| 44 | " | " | " | " | " | " | " | C₆H₄—C₆H₁₁(o) | " |
| 45 | " | " | " | " | " | CH₃ | " | C₆H₄—C₆H₅(p) | " |
| 46 | " | " | " | " | — | C₂H₅ | " | C₆H₄—C₆H₅(m) | " |
| 47 | " | " | " | " | — | " | " | C₆H₄—C₆H₅(o) | " |
| 48 | " | " | " | " | 2-CH₃ | — | C₂H₄OCO | C₆H₃(Cl)C₆H₅(o,p) | " |
| 48a | " | " | " | " | — | (CH₂)₂C₆H₅ | C₂H₄ | C₆H₅ | " |
| 49 | " | " | " | " | — | C₆H₅ | — | " | yellow |
| 50 | " | " | " | " | — | CH₃ | — | " | greenish-tinged yellow |
| 51 | " | " | " | " | 2-CH₃ | C₂H₅ | C₂H₄SO₂ | C₆H₄CC₂H₅(p) | " |
| 52 | " | " | " | " | — | C₄H₉ | " | C₆H₅ | " |
| 53 | " | " | " | " | 2-CH₃ | C₂H₅ | " | C₆H₄CH₃(p) | " |
| 54 | " | " | " | " | — | " | " | C₆H₄NHOOCH₃(m) | " |
| 55 | " | " | " | " | 2-CH₃ | " | C₂H₄O | C₆H₄OOC₆H₅(p) | " |
| 56 | " | " | " | " | — | " | " | C₆H₄SO₂C₆H₅(p) | " |
| 57 | " | " | " | " | — | " | " | C₆H₄OC₆H₅(p) | " |
| 58 | " | " | " | " | 2-CH₃ | " | " | C₆H₄SC₆H₅(p) | " |
| 59 | " | " | " | " | — | " | " | C₆H₄OCH₂C₆H₅(p) | " |
| 60 | " | " | " | " | — | " | " | p-C₆H₄COOC₆H₃(CH₃)₂(2,4) | " |
| 61 | " | " | " | " | — | " | " | \|<br>CH₃ | " |
| 62 | " | " | " | " | — | " | " | p-C₆H₄SO₂NHC₆H₅ | " |
| 63 | " | " | " | " | — | " | C₂H₄OOONH | p-C₆H₄NHOOC₆H₅ | " |
| 64 | " | " | " | " | — | " | " | m-C₆H₄OONHC₆H₅ | " |
| 65 | " | " | " | C₂H₄O | — | " | " | C₆H₄C₆H₁₁(p) | " |
| 66 | " | " | " | " | — | " | " | p-C₆H₄OC₆H₄Cl(p) | " |
| 67 | " | " | " | " | — | " | C₂H₄OCO | C₆H₄C₆H₅(p) | " |

TABLE 1-continued

| Example No. | R₁ | R₂ | R₃ | A | Substituents in ring a | R₄ | D | E | Colour shade of paper on bulk dyeing |
|---|---|---|---|---|---|---|---|---|---|
| 68 | " | " | " | " | 2-CH₃ | " | C₂H₄O | 2-(p-C₆H₄)-benzoxazole | " |
| 69 | " | " | " | " | " | " | " | 2-(p-C₆H₄)-5-methylbenzoxazole | " |
| 70 | " | " | " | " | — | " | " | 2-(p-C₆H₄)-5,7-dichlorobenzoxazole | " |
| 71 | " | " | " | " | 2-CH₃ | " | " | 2-(p-C₆H₄)-5-methylbenzothiazole | " |
| 72 | " | " | " | " | " | " | " | C₆H₄CH₂C₆H₅(p) | " |
| 73 | " | " | " | " | " | " | " | C₆H₄C(CH₃)₂C₆H₅(p) | " |
| 74 | " | " | " | " | " | " | " | C₆H₂(Cl)₂(t-C₄H₉)(2,5,4) | " |
| 75 | " | " | " | " | " | " | " | α-C₁₀H₇ | " |
| 76 | " | " | " | " | " | " | " | β-C₁₀H₇ | " |
| 77 | " | " | " | " | — | — | " | " | " |
| 78 | " | " | " | " | 2-CH₃ | " | " | methyl-tetrahydronaphthalene (CH₂)₄ | " |
| 79 | " | " | " | " | — | " | " | α-C₁₀H₆CH₂C₆H₅(α') | " |
| 80 | " | " | " | " | — | " | " | norbornyl-C₆H₄(p) | " |

TABLE 1-continued

| Example No. | R₁ | R₂ | R₃ | A | Substituents in ring a | R₄ | D | E | Colour shade of paper on bulk dyeing |
|---|---|---|---|---|---|---|---|---|---|
| 81 | " | " | " | " | 2-CH₃ | " | " | (2-methyl dibenzofuran structure) | " |
| 82 | C₂H₅ | C₂H₅ | C₂H₅ | " | — | CH₃ | CH₂ | C₆H₅ | " |
| 83 | " | " | " | " | — | " | " | C₆H₄Cl(p) | " |
| 84 | —CH=CH—N(CH₃)—CH= | | | " | — | C₂H₅ | " | C₆H₅ | " |
| 85 | CH₃ | CH₃ | CH₃ | CH₂CH(CH₃)CHO | — | " | " | " | " |
| 86 | " | (CH₂)₄ | | C₂H₄O | 2-CH₃ | " | C₂H₄OOOCH₂ | " | " |
| 87 | " | (CH₂)₅ | | " | " | CH₃ | C₂H₄OOOCH₂O | C₆H₄CH₃(p) | " |
| 88 | " | (CH₂)₂O(CH₂)₂ | | " | — | C₂H₄NHSO₂CH₃ | C₂H₄OCOCH₂S | C₆H₅ | " |
| 89 | " | CH₃ | " | " | — | CH₂CH=CH₂ | CH₂ | " | " |
| 90 | " | " | " | " | 2-CH₃ | C₂H₅ | C₂H₄ | " | " |
| 91 | " | " | " | " | — | CH₃ | CH₂ | C₆H₄CH₃(p) | " |
| 92 | " | " | " | " | 2-CH₃ | C₂H₅ | (CH₂)₃ | C₆H₅ | " |
| 93 | C₄H₉ | " | CH₃ | " | — | CH₃ | C₂H₄S | C₆H₄CH₃(p) | " |
| 94 | CH₂C₆H₄Cl(p) | " | " | " | — | C₂H₅ | CH₂ | C₆H₅ | " |
| 95 | C₂H₄OC₆H₅ | " | " | " | — | " | C₂H₄ | C₆H₄CH₃(p) | " |
| 96 | C₂H₄OC₂H₅ | " | " | " | — | C₂H₅ | CH₂ | C₆H₅ | " |
| 97 | C₂H₄OCH₂C₆H₅ | " | " | " | — | " | " | " | " |
| 98 | C₂H₄OOOC₆H₅ | " | " | " | — | " | " | C₆H₄CH₃(p) | " |
| 99 | C₂H₄OC₁₀H₇(8) | " | " | " | — | " | — | C₆H₅ | " |
| 100 | C₄H₉ | C₄H₉ | C₄H₉ | " | — | CH₃ | CH₂ | " | " |
| 101 | | | | | | | | | |
| 102 | | | | | | | | | |
| 103 | CH₃ | CH₃ | CH₃ | CH₂CH(C₆H₅)CHO | — | CH₃ | CH₂ | " | " |
| 104 | " | " | " | CH₂CH(CH₂OCH₂C₆H₅)CHO | — | C₂H₅ | " | " | yellow |
| 105 | " | " | " | CH₂CH(CH₂OC₄H₉)CHO | — | " | " | " | greenish-tinged yellow |

TABLE 1-continued

| Example No. | R₁ | R₂ | R₃ | A | Substituents in ring a | R₄ | D | E | Colour shade of paper on bulk dyeing |
|---|---|---|---|---|---|---|---|---|---|
| 106 | " | " | " | CH₂CHO<br>\|<br>CH₂OC₆H₅ | — | " | " | " | " |
| 107 | " | " | " | C₂H₄O | 2-CH₃ | " | C₂H₄NHOO | C₆H₄CH₃(p) | " |
| 108 | " | " | " | " | — | " | C₂H₄NHSO₂ | C₆H₄CH₃(p) | " |
| 109 | " | " | " | " | 2-CH₃ | " | C₂H₄OC₂H₄O | C₆H₄—C₆H₁₁(p) | " |
| 110 | " | " | " | " | " | " | C₂H₄O | C₆H₄N=N—C₆H₅(p) | yellow |
| 111 | " | " | " | " | " | " | C₂H₄OOCCH=CH | C₆H₅ | greenish-tinged yellow |

EXAMPLE 112

After adding catalytic amounts of piperidine, a solution of 17.8 parts of N-ethyl-N-β-(benzthiazol-2-yl-mercapto)ethyl-4-amino-2-methyl-benzaldehyde and 14.1 parts of cyanoacetic acid choline ester methosulphate in 60 parts by volume of dimethylformamide is heated to 80°–90° C. for 4 hours. The solvent is then distilled off in vacuo and the crystalline crude dyestuff is obtained as the residue; for purification, this is treated with about 400 parts by volume of isopropanol at the boil, filtered off after cooling and then recrystallised from dimethylformamide/ethyl acetate. This gives 18 parts of the pure dyestuff of the formula

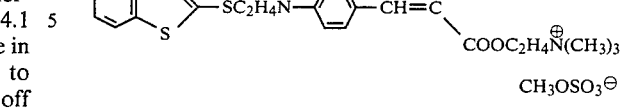

$CH_3OSO_3^\ominus$ which has a melting point of 183°–185° C. and a $\lambda_{max}$ ($H_2O$) of 455 nm.

When used in conventional ways, the dyestuff imparts to polyacrylonitrile (®Dralon) a clear, greenish-tinged yellow dyeing which has very good fastness to light and washing coupled with a high general level of fastness properties. It has an outstanding affinity for lignin-containing paper pulps and also dyes bleached sulphite pulps which are free from lignin or have a low lignin content intense greenish-tinged yellow, so that the load on the waste water remains low.

The dyestuffs of Table 2 which follows are prepared analogously to Example 112 or Example 2.

TABLE 2

| Example No. | $R_1$ | $R_2$ | $R_3$ | A | Substituents in ring a | $R_4$ | D | E | Colour shade of paper on bulk dyeing |
|---|---|---|---|---|---|---|---|---|---|
| 113 | $CH_3$ | $CH_3$ | $CH_3$ | $C_2H_4O$ | — | $C_2H_5$ | $C_2H_4S$ | benzothiazol-2-yl | greenish-tinged yellow |
| 114 | $CH_2C_6H_5$ | " | " | " | — | " | " | " | greenish-tinged yellow |
| 115 | $CH_3$ | " | " | " | — | $C_2H_4C_6H_5$ | " | " | greenish-tinged yellow |
| 116 | " | " | " | " | 2-$CH_3$ | $C_2H_5$ | " | benzimidazol-2-yl | greenish-tinged yellow |
| 117 | " | " | " | " | — | " | $C_2H_4OCOCH_2$ | benzoxazol-2-yl | greenish-tinged yellow |
| 118 | " | $(CH_2)_5$ | | " | — | " | $C_2H_4OCOCH_2S$ | benzothiazol-2-yl | greenish-tinged yellow |
| 119 | —CH=CH—CH=CH—CH= | | | " | — | " | $C_2H_4S$ | 6-chloro-benzothiazol-2-yl | greenish-tinged yellow |

TABLE 2-continued

Structure:
$$R_1, R_2, R_3-\overset{\oplus}{N}-A-CO-C(NC)=CH-\text{(ring a)}-N(R_4)-D-E \quad An^\ominus$$

with ring a positions 2,3,5,6

| Example No. | $R_1$ | $R_2$ | $R_3$ | A | Substituents in ring a | $R_4$ | D | E | Colour shade of paper on bulk dyeing |
|---|---|---|---|---|---|---|---|---|---|
| 120 | $C_2H_5$ | $C_2H_5$ | $C_2H_5$ | " | — | $CH_3$ | $C_2H_4OCOCH_2$ | 2-methyl-5-methyl-benzoxazole | greenish-tinged yellow |
| 121 | $CH_3$ | $CH_3$ | $CH_3$ | $CH_2CHO\,|\,C_6H_5$ | — | " | $C_2H_4S$ | 1,2-dimethyl-benzimidazole | greenish-tinged yellow |
| 122 | " | " | " | $C_2H_4O$ | 2-$CH_3$ | " | $C_2H_4CONH$ | 2-methyl-benzothiazole | greenish-tinged yellow |
| 123 | $C_6H_{11}$ | " | " | " | — | $C_2H_5$ | $C_2H_4S$ | " | greenish-tinged yellow |
| 124 | $CH_3$ | " | " | $CH_2CHO\,|\,CH_3$ | — | " | " | " | greenish-tinged yellow |
| 125 | " | " | " | $(CH_2)_3NH$ | — | " | " | " | greenish-tinged yellow |
| 126 | " | " | " | $CH_2CHO\,|\,CH_2OC_6H_5$ | — | " | " | " | greenish-tinged yellow |
| 127 | " | " | " | $C_2H_4O$ | — | $CH_2C_6H_5$ | " | " | greenish-tinged yellow |
| 128 | " | " | " | " | 2-$CH_3$ | $C_2H_4O\,|\,H_5C_2$ | " | " | greenish-tinged yellow |
| 129 | " | " | " | " | — | $C_4H_9$ | " | " | greenish-tinged yellow |
| 130 | " | " | " | " | — | $C_2H_4CN$ | " | 2-methyl-6-chloro-benzothiazole | greenish-tinged yellow |

EXAMPLE 131

A solution of 5.1 1 parts of cyanoacetic acid in 18.3 parts of acetic anhydride is stirred for 1 hour at 50° C., after adding 14.5 parts of N-cyclohexyl-N-β-hydroxyethyl-N,N-dimethylammonium chloride the mixture is kept at 30° C. for a further 1 hour and after adding 20.2 parts of N-β-phthalimidoethyl-N-ethyl-4-amino-2-methyl-benzaldehyde the resulting mixture is heated to 80° C. for 7 hours. 7 parts of water are then added in order to destroy the excess acetic anhydride, and about 65 parts of an approximately 55% strength liquid formulation of the dyestuff of the formula

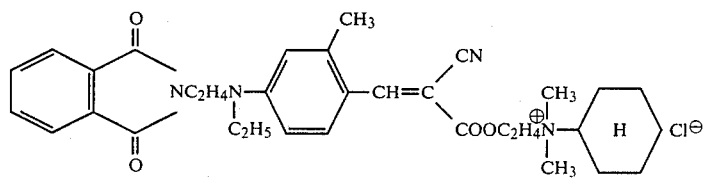

are obtained.

The product dyes polyacrylonitrile and acid-modified polyester fibres in greenish-tinged yellow shades which have good fastness properties in use and also dyes wood pulp-containing paper pulps, with outstanding affinity, in a greenish-tinged yellow shade which is likewise very clear.

A large number of liquid formulations and powder dyestuffs (according to Example 1) of analogous structures are accessible in a corresponding manner. Table 3 which follows gives a selection of dyestuffs which have been prepared and the colour shade of wood pulp-containing paper bulk-dyed with these dyestuffs.

TABLE 3

| Example No. | $R_1$ | $R_2$ | $R_3$ | A | Substituents in ring a | $R_4$ | D | E | Colour shade of paper on bulk dyeing |
|---|---|---|---|---|---|---|---|---|---|
| 132 | $CH_3$ | $CH_3$ | $CH_3$ | $C_2H_4O$ | 2-$CH_3$ | $C_2H_5$ | $C_2H_4$ | phthalimide | greenish-tinged yellow |
| 133 | $CH_2C_6H_5$ | " | " | " | " | " | " | benzisothiazole-$S,S$-dioxide | greenish-tinged yellow |
| 134 | $CH_3$ | " | " | " | " | $C_4H_9$ | " | " | greenish-tinged yellow |
| 135 | $C_2H_5$ | $C_2H_5$ | $C_2H_5$ | " | " | $CH_3$ | " | " | greenish-tinged yellow |
| 136 | " | " | " | " | " | " | " | phthalimide | greenish-tinged yellow |
| 137 | " | \multicolumn{2}{c}{$(CH_2)_5$} | " | 2-$CH_3$ | $C_2H_5$ | " | " | greenish-tinged yellow |
| 138 | " | $CH_3$ | $CH_3$ | " | " | " | $CH_2CH$<br>$\mid$<br>$CH_3$ | " | greenish-tinged yellow |
| 139 | " | " | " | " | " | " | $CH_2CH-C_6H_5$ | " | greenish-tinged yellow |
| 140 | $CH_3$ | " | " | " | " | $C_2H_4OC_6H_5$ | $C_2H_4$ | " | greenish-tinged yellow |
| 141 | " | " | " | " | — | $C_2H_5$ | $(CH_2)_3$ | " | greenish- |

TABLE 3-continued

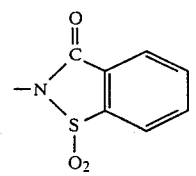

| Example No. | R₁ | R₂ | R₃ | A | Substituents in ring a | R₄ | D | E | Colour shade of paper on bulk dyeing |
|---|---|---|---|---|---|---|---|---|---|
| | | | | | | | | | tinged yellow |
| 142 | " | " | " | CH₂CHO<br>\|<br>C₆H₅ | — | " | C₂H₄ | " | greenish-tinged yellow |
| 143 | " | " | " | C₂H₄O | 2-CH₃ | CH₂C₆H₅ | " | " | greenish-tinged yellow |
| 144 | " | " | " | (CH₂)₃NH | " | " | " | " | greenish-tinged yellow |
| 145 | " | " | " | C₂H₄O | " | C₂H₄C₆H₅ | C₂H₄ | " | greenish-tinged yellow |
| 146 | " | " | " | " | " | " | " | 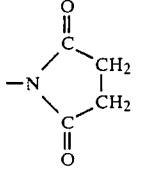 | greenish-tinged yellow |
| 147 | CH₂C₆H₅ | " | " | " | " | C₂H₅ | (CH₂)₃ | 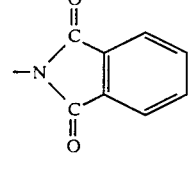 | greenish-tinged yellow |
| 148 | CH₃ | " | " | " | " | " | (CH₂)₂O(CH₂)₂ | 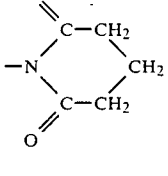 | greenish-tinged yellow |
| 149 | C₂H₅ | C₂H₅ | C₂H₅ | " | " | " | C₂H₄ | 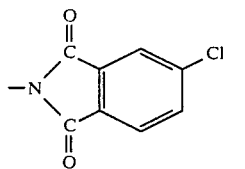 | greenish-tinged yellow |
| 150 | CH₃ | CH₃ | CH₃ | CH₂CHO<br>\|<br>CH₃ | " | " | " |  | greenish-tinged yellow |

TABLE 3-continued $$\begin{array}{c} R_1 \\ R_2-\overset{\oplus}{N}-A-CO \\ R_3 \end{array} \overset{NC}{\underset{}{C}}=CH-\underset{a}{\bigcirc}\overset{6\ 5}{\underset{2\ 3}{}}-N\overset{R_4}{\underset{D-E}{}} \quad An^{\ominus}$$

| Example No. | R₁ | R₂ | R₃ | A | Substituents in ring a | R₄ | D | E | Colour shade of paper on bulk dyeing |
|---|---|---|---|---|---|---|---|---|---|
| 151 | " | " | " | C₂H₄O | " | " | " | ![phthalimide with CH3] | greenish-tinged yellow |

EXAMPLE 152

A solution of 10.2 parts of cyanoacetic acid in 36.6 parts of acetic anhydride is first warmed to 50° C. for 1 hour and after adding 30.2 parts of N-benzyl-N-hydroxyethyl-N,N-dimethylammonium chloride the mixture is stirred at 30° C. for 1 hour, 17.6 parts of N,N'-diphenyl-piperazine-4',4''-dicarboxaldehyde are then added and, finally, the resulting mixture is heated to 80° C. for 8 hours. 14 parts of water are now added in order to decompose excess acetic anhydride and in this way about 108 parts of a dyestuff solution are obtained which contains about 50% of the dyestuff of the formula

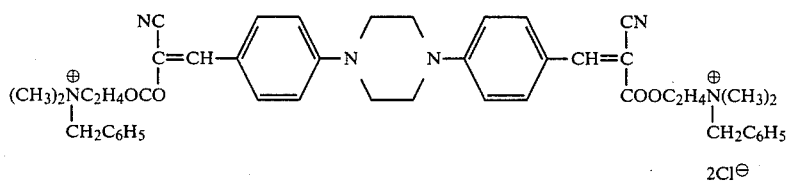

The product dyes lignin-containing paper pulps, with high affinity, in deep, greenish-tinged yellow shades with slight staining of the waste water. Dyestuffs which are obtained analogously by varying the starting compounds and have comparable coloristic properties are listed in Table 4.

TABLE 4

$$\begin{array}{c} R_1 \\ R_2-\overset{\oplus}{N}-A-CO \\ R_3 \end{array} \overset{NC}{\underset{R'}{C}}-\bigcirc-N\overset{}{\underset{}{\bigcap}}N-\bigcirc-CH=\overset{CN}{\underset{R'}{C}}-CO-A-\overset{\oplus}{N}\overset{R_1}{\underset{R_3}{\oplus}} \quad 2An^{\ominus}$$

| Example No. | R₁ | R₂ | R₃ | A | R' |
|---|---|---|---|---|---|
| 153 | CH₃ | CH₃ | CH₃ | C₂H₄O | H |
| 154 | C₂H₅ | C₂H₅ | C₂H₅ | C₂H₄O | H |
| 155 | —CH=CH—CH=CH—CH= | | | C₂H₄O | H |
| 156 | CH₃ | | (CH₂)₅ | C₂H₄O | H |
| 157 | CH₃ | CH₃ | CH₃ | CH₂CHO(C₆H₅) | H |
| 158 | CH₃ | CH₃ | CH₃ | C₂H₄O | CH₃ |

EXAMPLE 159

After adding catalytic amounts of piperidine, a solution of 12 parts of cyanoacetic acid choline ester methosulphate and 16.9 parts of N-β-(benzthiazol-2-yl-mercapto)ethyl-2,2,4-trimethyl-6-formyl-1,2,3,4-tetrahydroquinoline in 60 parts by volume of dimethylformamide is heated to 80°–90° C. for 4 hours, the solvent is then distilled off completely in vacuo and the residual colour resin (about 30 parts) is dissolved in an equal amount by weight of glacial acetic acid. This gives an approximately 50% strength solution of the dyestuff of the formula

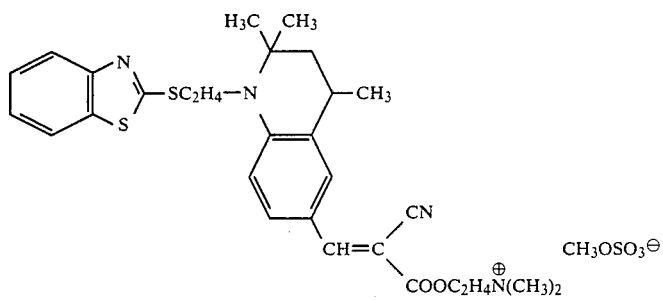

($\lambda_{max}$/H$_2$O=452 nm).

The product is suitable for dyeing polyacrylonitrile (®Dralon) and acid-modified polyester fibres (for example ®Dacron 64), greenish-tinged yellow dyeings with good fastness to light and washing and good general fastness properties being obtained. Particularly good coloristic results are found on bulk dyeing lignin-containing and lignin-free paper pulps because of the outstanding affinity of the product for these substrates. The staining of the waste water which is observed is correspondingly low.

Table 5 which follows contains a selection of dyestuffs according to the invention prepared analogously to the above example or analogously to Example 2 and states the colour shade obtained with these dyestuffs in bulk-dyed paper. The affinity for lignin-containing papers is very good in all cases and the affinity for lignin-free sulphite pulps is in many cases good to very good.

TABLE 5

$$\begin{array}{c} R_1 \\ R_2-N-A-CO \\ R_3 \end{array} \oplus \quad \begin{array}{c} NC \\ C=C \end{array} \quad \begin{array}{c} Q_2 \\ N-D-E \end{array} \quad An^\ominus$$

| Example No. | $R_1$ | $R_2$ | $R_3$ | A | R' | $Q_2$ | —D—E | Colour shade of bulk-dyed paper |
|---|---|---|---|---|---|---|---|---|
| 160 | $C_2H_5$ | $C_2H_5$ | $C_2H_5$ | $C_2H_4O$ | H | $CH_2CH(CH_3)$ | $C_2H_4OC_6H_4Cl(p)$ | greenish-tinged yellow |
| 161 | $CH_3$ | $CH_3$ | $CH_3$ | " | " | $C(CH_3)_2CH(CH_3)$ | $C_2H_4SC_6H_4CH_3(p)$ | " |
| 162 | " | " | " | $CH_2CHO$<br>$\quad\quad C_6H_5$ | " | " | $C_2H_5$ | " |
| 163 | " | " | " | $C_2H_4O$ | $CH_3$ | $CH(CH_3)CH_2C(CH_3)_2$ | $C_2H_4Cl$ | " |
| 164 | $CH_2C_6H_5$ | " | " | " | H | " | $CH_3$ | " |
| 165 | $CH_3$ | " | " | $CH_2CH$<br>$\quad\quad CH_2OC_6H_5$ | " | " | $C_2H_4OC_2H_5$ | " |
| 166 | " | " | " | $(CH_2)_3NH$ | " | " | $C_2H_4OC_6H_4(t-C_4H_9)(p)$ | " |
| 167 | " | " | " | $C_2H_4O$ | " | " | $CH_2C_6H_5$ | " |
| 168 | " | —CH=CH—CH=CH—CH— | $(CH_2)_5$ | " | " | " | " | " |
| 169 | $CH_3$ | $CH_3$ | $CH_3$ | " | " | " | $C_2H_4OCONHC_6H_{11}$ | " |
| 170 | " | " | " | " | " | " | $C_2H_4OCONHC_6H_4C_6H_{11}(p)$ | " |
| 171 | " | " | " | " | $CH_3$ | " | $C_2H_4C_6H_5$ | " |
| 172 | " | " | " | " | H | " | $C_2H_4OC_6H_4C_6H_5(p)$ | " |
| 173 | " | " | " | " | " | " | $C_2H_4OCOC_6H_4C_6H_5(p)$ | " |
| 174 | " | " | " | " | " | " | $C_2H_4OCOC_6H_4COOCH_3(p)$ | " |
| 175 | " | " | " | " | " | " | $CH_2CHOC_6H_5$<br>$\quad\quad C_6H_5$ | " |
| 176 | " | " | " | " | " | " | $C_2H_4OC_6H_4OC_2H_5(p)$ | " |
| 177 | " | " | " | " | " | " | $C_2H_4OC_6H_4OC_6H_5(p)$ | " |
| 178 | " | " | " | $CH_2CHO$<br>$\quad\quad CH_3$ | " | " | $CH_2C_6H_4CH_3(p)$ | " |
| 179 | " | " | " | $C_2H_4O$ | " | " | $C_2H_4OC_6H_4-C(CH_3)_2CH_2C(CH_3)_3(p)$ | " |
| 180 | " | " | " | " | " | " | $C_2H_4OC_6H_4COC_6H_5(p)$ | " |
| 181 | " | " | " | " | " | " | $C_2H_4OC_6H_4SO_2C_6H_5(p)$ | " |
| 182 | " | " | " | " | " | " | $C_2H_4OC_6H_4C_6H_{11}(o)$ | " |
| 183 | " | " | " | " | " | " | $C_2H_4OC_6H_4C_6H_5(o)$ | " |
| 184 | " | " | " | " | " | " | $C_2H_4OC_6H_4C_6H_5(m)$ | " |

TABLE 5-continued

Structure:
$$R_1, R_2, R_3-\overset{\oplus}{N}-A-CO \quad \text{with} \quad NC-C=CH-\text{(phenyl with } Q_2, R'\text{)}-N(D-E) \quad An^{\ominus}$$

| Example No. | R₁ | R₂ | R₃ | A | Q₂ | R' | –D–E | Colour shade of bulk-dyed paper |
|---|---|---|---|---|---|---|---|---|
| 185 | " | " | " | " | " | " | C₂H₄OC₆H₄OCH₂C₆H₅(p) | " |
| 186 | " | " | " | " | " | " | CH₂CHSO₂C₆H₄CH₃(p) <br> \|<br> CH₃ | " |
| 187 | " | " | " | " | " | " | C₂H₄OC₆H₄SO₂NHC₆H₅(p) | " |
| 188 | " | " | " | " | " | " | C₂H₄OC₆H₄SO₂NHC₆H₁₁(p) | " |
| 189 | " | " | " | " | " | " | CH₂C₆H₄SO₂N(C₂H₅)₂(m) | " |
| 190 | " | " | " | " | " | " | C₂H₄OCOC₆H₅ | " |
| 191 | " | " | " | " | " | " | C₂H₄OCOC₆H₅ | " |
| 192 | " | " | " | " | " | " | C₂H₄OCOCH₂OC₆H₄Cl(o) | " |
| 193 | " | " | " | " | " | " | C₂H₄OCOCH₂SC₆H₄(t-C₄H₉)(p) | " |
| 194 | " | " | " | " | " | " | C₂H₄OC₆H₄CONHC₆H₅(p) | " |
| 195 | " | " | " | " | " | " | C₂H₄OC₆H₄– 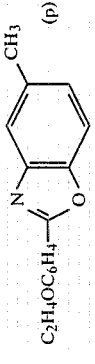 | " |
| 196 | " | " | " | " | " | " | C₂H₄OC₆H₄– 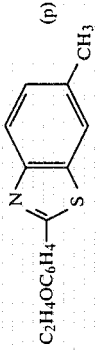 | " |
| 197 | " | " | " | " | " | " | C₂H₄OC₆H₄CH₂C₆H₅(p) | " |
| 198 | " | " | " | " | " | " | C₂H₄OC₆H₄C(CH₃)₂C₆H₅(p) | " |
| 199 | " | " | " | " | " | " | C₂H₄OC₁₀H₇(B) | yellow |
| 200 | " | " | " | " | " | " | C₂H₄OC₆H₄N=NC₆H₅(p) | greenish-tinged yellow |
| 201 | " | " | " | " | " | " | 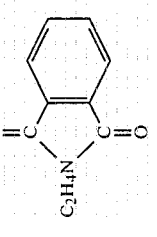 | |

TABLE 5-continued

Structural formula:

$$R_1\text{—}\overset{R_2}{\underset{R_3}{N^{\oplus}}}\text{—}A\text{—}CO\text{—}O\text{—}\underset{NC}{C}=CH\text{—}\underset{R'}{\text{[phenyl]}}\text{—}\underset{Q_2}{N}\text{—}D\text{—}E \quad An^{\ominus}$$

| Example No. | $R_1$ | $R_2$ | $R_3$ | A | R' | $Q_2$ | —D—E | Colour shade of bulk-dyed paper |
|---|---|---|---|---|---|---|---|---|
| 202 | " | " | " | CH$_2$CHO / CH$_3$ | " | " | " | " |
| 203 | " | " | " | C$_2$H$_4$O | " | phenyl (o-tolyl) | C$_2$H$_4$N—[benzisothiazol-3(2H)-one 1,1-dioxide] | yellow |
| 204 | " | " | " | " | " | " | CH$_2$C$_6$H$_5$ | " |
| 205 | " | " | " | " | " | OC(CH$_3$)$_2$CH(CH$_3$) | C$_2$H$_5$ | " |
| 206 | " | " | " | " | OCH$_3$ | OCH$_2$CH(C$_6$H$_5$) | CH$_3$ | " |
| 207 | " | " | " | " | H | o-methoxyphenyl | " | " |
| 208 | " | " | " | " | " | o-methylthiophenyl | C$_2$H$_5$ | " |
| 209 | " | (CH$_2$)$_4$ | " | " | " | o-tolyl | CH$_3$ | " |
| 210 | " | (CH$_2$)$_2$O(CH$_2$)$_2$ | " | " | " | " | C$_4$H$_9$ | " |
| 211 | C$_2$H$_5$ | C$_2$H$_5$ | CH$_3$ | " | " | " | CH$_2$C$_6$H$_5$ | " |

EXAMPLE 212

5.1 parts of cyanoacetic acid in 18.3 parts of acetic anhydride are warmed to 50° C. for 1 hour, after adding 9.8 parts of choline chloride the mixture is stirred at 30° C. for a further 1 hour and after introducing 12.1 parts of julolidinaldehyde the mixture is heated to 80° C. for 7 hours. Excess acetic anhydride is then decomposed of adding 7 parts of water. About 52 parts of a dyestuff solution are obtained which contains about 52% of the dyestuff of the formula

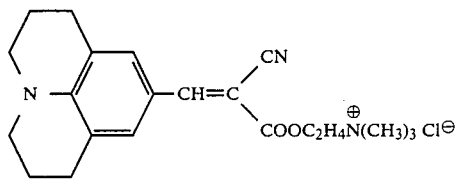

The product is particularly suitable for bulk dyeing lignin-containing papers in greenish-tinged yellow shades and is distinguished by high affinity and a low load on the waste water.

EXAMPLE 213

If, in Example 212, the choline chloride is replaced by 15.1 parts of N-benzyl-N-β-hydroxyethyl-N,N-dimethylammonium chloride, the same procedure gives about 58 parts of a dyestuff solution which contains about 56% of the dyestuff of the formula

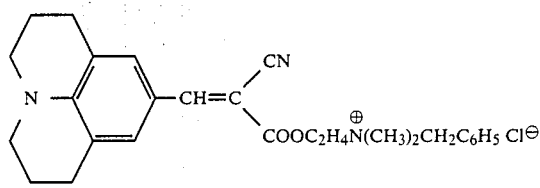

The product dyes lignin-containing papers in greenish-tinged yellow shades.

EXAMPLE 214

After adding catalytic amounts of piperidine, a solution of 6 parts of N-methyl-diphenylamine-4,4'-dicarboxaldehyde and 15.5 parts of cyanoacetic acid choline ester methosulphate in 60 parts by volume of dimethylformamide is heated to 80°–90° C. for 9 hours. After distilling off the solvent under reduced pressure, 22 parts of a colour resin remain and this is boiled thoroughly with isopropanol several times. During this procedure, the dyestuff crystallises completely and it is isolated by filtering off, washed with isopropanol and dried in vacuo at 40° C. Yield: 17.5 parts of the dyestuff of the formula

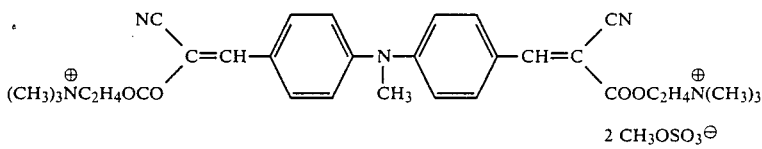

which melts between 78° and 90° C., with decomposition.

$\lambda_{max}(H_2O) = 459$ nm.

On bulk dyeing unsized and sized wood pulp-containing papers, the product displays outstanding affinities and very little standing of the waste water.

Following a procedure analogous to Example 152 gives the chloride of the same dyestuff in the form of a glacial acetic acid solution thereof.

Further dyestuffs of the diphenylamine and cyclised diphenylamine type, which are prepared by appropriate variation in the starting materials, are listed in Table 6. They all dye lignin-containing paper pulps with high affinities in yellow shades.

TABLE 6

$$\begin{array}{c} R_1 \\ R_2-\overset{\oplus}{N}-A-CO \\ R_3 \end{array} \begin{array}{c} NC \\ \diagdown \\ C=CH-G-CH=C \\ \diagup \end{array} \begin{array}{c} CN \\ \diagdown \\ CO-A-\overset{\oplus}{N}-R_2 \ 2\ An^{\ominus} \\ R_3 \end{array}$$

| Example No. | $R_1$ | $R_2$ | $R_3$ | A | G | Colour shade of bulk-dyed paper |
|---|---|---|---|---|---|---|
| 215 | $CH_3$ | $CH_3$ | $CH_3$ | $C_2H_4O$ | ⟨⟩-N(C₂H₅)-⟨⟩ | yellow |
| 216 | $CH_2C_6H_5$ | " | " | " | ⟨⟩-N(CH₃)-⟨⟩ | " |

TABLE 6-continued $$\begin{array}{c} NC \\ R_1 \\ R_2-N-A-CO \end{array} C=CH-G-CH=C \begin{array}{c} CN \\ R_1 \\ CO-A-N-R_2 \ 2 \ An^{\ominus} \\ R_3 \end{array}$$

| Example No. | $R_1$ | $R_2$ | $R_3$ | A | G | Colour shade of bulk-dyed paper |
|---|---|---|---|---|---|---|
| 217 | —CH=CH—CH=CH—CH= | | | " | " | " |
| 218 | CH₃ | (CH₂)₅ | | " | " | " |
| 219 | " | CH₃ | CH₃ | CH₂CHO<br>\|<br>CH₃ | " | " |
| 220 | " | " | " | (CH₂)₃NH | " | greenish-tinged yellow |
| 221 | " | " | " | C₂H₄O | carbazole with N-C₂H₅ | yellow |
| 222 | " | " | " | " | diphenyl ether with N-CH₃ | " |
| 223 | " | " | " | " | diphenyl sulfide with N-CH₃ | " |
| 224 | " | " | " | " | carbazole with N-C₂H₄Cl | " |

EXAMPLE 225

A solution of 10.2 parts of cyanoacetic acid in 36.6 parts of acetic anhydride is warmed to 50° C. for 1 hour, 20 parts of choline chloride are added and the mixture is stirred at 30° C. for a further 1 hour. 17.5 parts of N,N'-diethyl-N,N'-bis-(4-formylphenyl)-ethylenediamine are now added and the resulting mixture is heated to 80° C. for b 8 hours, whilst stirring. After the reaction mixture has cooled, the resulting crystal slurry is filtered off and digested in about 150 parts by volume of isopropanol and the product is filtered off again, washed with isopropanol and dried in vacuo at 50° C. 31.4 parts of crude dyestuff which, for further purification, can be recrystallised from dimethylformamide and then melts at 165°–170° C. The dyestuff has the structure

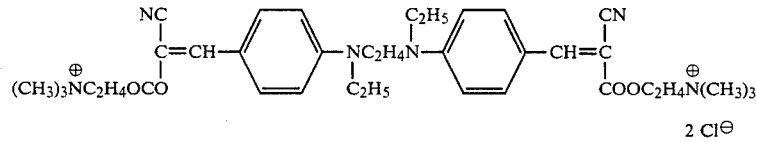

2 Cl⁻ absorbs in aqueous solution at $\lambda_{max}=421$ nm with a shoulder at 455 nm and dyes sized and unsized wood pulp-containing sulphite pulp, with outstanding affinity for the paper pulp, in clear yellow shades.

EXAMPLE 226

A mixture of 9.9 parts of the dialdehyde of the formula

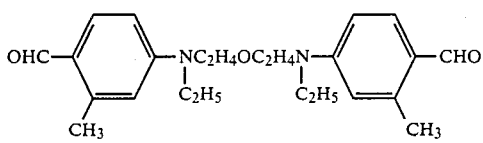

and 15.5 parts of cyanoacetic acid choline ester methosulphate in 60 parts by volume of dimethylformamide, to which catalytic amounts of piperidine are added, is heated to 80°–90° C. for 8.5 hours. After cooling and standing for several hours, the dyestuff which has crystallised out is filtered off, washed with a little dimethylformamide, recrystallised from dimethylformamide/ethyl acetate and dried. The product melts pure at 215°–219° C., absorbs in aqueous solution at $\lambda_{max}=437$ nm and has the structure

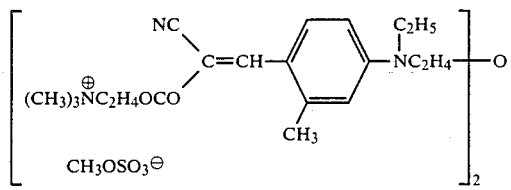

It bulk dyes sized and unsized lignin-containing paper with very good affinity in greenish-tinged yellow shades.

EXAMPLE 227

A solution of 5.1 parts of cyanoacetic acid in 18.3 parts of acetic anhydride is warmed to 50° C. for 1 hour and after adding 10 parts of choline chloride the mixture is stirred at 30° C. for a further 1 hour. 14.2 parts of the dialdehyde of the formula

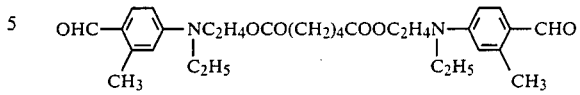

and catalytic amounts of piperidine are then added to the mixture and the resulting mixture is heated to 80° C. for 6 hours, whilst stirring. After decomposing excess acetic anhydride by adding 7 parts of water, 54.5 parts of a dyestuff solution are obtained which contains about 50% of the dyestuff of the formula

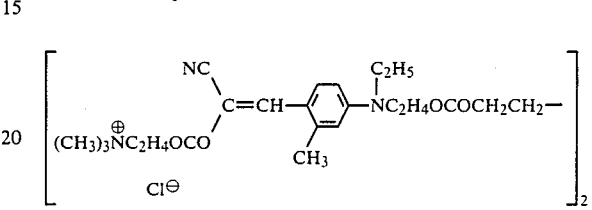

$\lambda_{max}(H_2O)=441$ nm.

The pure dyestuff is obtained analogously to Example 226 in the form of the bis-methosulphate with a melting point of 159°–164° C. by recrystallising the crude product, which has been boiled thoroughly with isopropanol, from dimethylformamide/ethyl acetate.

The dyestuff bulk dyes sized and unsized wood pulp-containing sulphite pulp in clear, greenish-tinged yellow shades. It has excellent affinity for the substrate, so that the staining of the waste water is very slight.

A large number of bis-quaternary styryl dyestuffs are accessible by a procedure analogous to that described in Example 225–227 and by choosing appropriate starting materials. Examples of this type are listed in Table 7 and these are likewise distinguished, above all, by very good affinities for lignin-containing paper pulps.

TABLE 7

$$R_2-\overset{\oplus}{\underset{R_3}{N}}-A-CO-\overset{NC}{\underset{}{C}}=CH-\underset{3}{\overset{6}{\underset{\text{(ring a)}}{\bigcirc}}}\overset{5}{\underset{}{-N}}\overset{R_4}{\underset{D_5}{-}}-N\overset{R_4}{\underset{}{-}}-\underset{3}{\overset{6}{\underset{\text{(ring a)}}{\bigcirc}}}\overset{5}{\underset{}{-}}CH=C\overset{CN}{\underset{CO-A-\overset{\oplus}{\underset{R_3}{N}}-R_2}{}}\ 2\,An^{\ominus}$$

| Example No. | $R_1$ | $R_2$ | $R_3$ | A | Substituents on rings a | $R_4$ | $D_5$ | Colour shade of bulk-dyed paper |
|---|---|---|---|---|---|---|---|---|
| 228 | $CH_3$ | $CH_3$ | $CH_3$ | $C_2H_4O$ | — | $C_2H_5$ | $C_2H_4OC_2H_4$ | greenish-tinged yellow |
| 229 | " | " | " | " | — | $CH_3$ | $C_2H_4OCO(CH_2)_4COOC_2H_4$ | " |
| 230 | " | $C_2H_5$ | $C_2H_5$ | " | — | $C_2H_5$ | ![m-xylylene: CH2-C6H4-CH2] | " |
| 231 | $C_2H_5$ | $C_2H_5$ | $C_2H_5$ | " | — | $CH_3$ | $C_2H_4SC_2H_4$ | " |
| 232 | —CH=CH—CH=CH—CH= | | | " | 2,2-di-$CH_3$ | $C_2H_5$ | $C_2H_4SO_2C_2H_4$ | " |
| 233 | $CH_3$ | $CH_3$ | $CH_3$ | " | — | " | $C_2H_4N(CH_3)C_2H_4$ | " |
| 234 | " | $(CH_2)_5$ | | " | — | " | $C_2H_4O$–C$_6$H$_4$–CH$_2$–C$_6$H$_4$–OC$_2$H$_4$ | " |
| 235 | " | $(CH_2)_4$ | | " | — | " | $C_2H_4O$–C$_6$H$_4$(OC$_2$H$_4$)– | " |
| 236 | " | $CH_3$ | $CH_3$ | " | 2,2-di-$CH_3$ | " | $C_2H_4OCO$–C$_6$H$_4$–$COOC_2H_4$ | " |
| 237 | " | " | " | " | " | " | $C_2H_4NHCO(CH_2)_2CONHC_2H_4$ | " |

TABLE 7-continued

Structure:

$$R_2-\overset{R_1}{\underset{R_3}{\overset{\oplus}{N}}}-A-CO\underset{NC}{\overset{}{\diagdown}}C=CH-\underset{}{\overset{6\ 5}{\underset{2\ 3}{\bigcirc}}}^a-\underset{R_4}{N}-D_5-\underset{R_4}{N}-\underset{}{\overset{6\ 5}{\underset{2\ 3}{\bigcirc}}}^a-CH=C\underset{CO-A-\overset{\oplus}{N}-R_2}{\overset{CN}{\diagup}}\underset{R_3}{\overset{R_1}{\ }}\quad 2\ An^{\ominus}$$

| Example No. | $R_1$ | $R_2$ | $R_3$ | A | Substituents on rings a | $R_4$ | $D_5$ | Colour shade of bulk-dyed paper |
|---|---|---|---|---|---|---|---|---|
| 238 | " | " | " | " | " | " | $C_2H_4OCONH$–[benzene ring with $CH_3$ and $NHCOOC_2H_4$] | " |
| 239 | " | " | " | " | " | " | $C_2H_4OCONH(CH_2)_6NHCOOC_2H_4$ | " |
| 240 | " | " | " | " | — | " | $C_2H_4OCO$–[biphenyl]–$OCOC_2H_4$ | " |
| 241 | " | " | " | " | — | " | $C_2H_4CONH$–[phenyl–$CH_2$–phenyl with $NHCOC_2H_4$] | " |
| 242 | " | " | " | " | 2,2-di-CH$_3$ | $CH_3$ | $C_2H_4CONH(CH_2)_2NHCOC_2H_4$ | " |
| 243 | " | " | " | " |  | $C_2H_5$ | $C_2H_4CONHNHCOC_2H_4$ | " |
| 244 | " | " | " | " | " | " | $C_2H_4COO$–[phenyl]–$OCOC_2H_4$ | " |
| 245 | " | " | " | " | " | " | $C_2H_4OCOOC_2H_4$ | " |
| 246 | " | " | " | $\underset{CH_3}{CH_2CHO}$ | — | " | $C_2H_4OCO(CH_2)_4COOC_2H_4$ | " |
| 247 | " | " | " | $C_2H_4O$ | — | " | $C_2H_4OCOCH=CHCOOC_2H_4$ | " |

TABLE 7-continued

Structure:
$$R_2-\overset{R_1}{\underset{R_3}{\overset{\oplus}{N}}}-A-CO-\underset{NC}{\overset{}{C}}=CH-\underset{3}{\overset{6\quad 5}{\underset{a}{\bigcirc}}}\underset{2}{}-N\underset{R_4}{-}D_5-N\underset{R_4}{-}\underset{3}{\overset{5\quad 6}{\underset{a}{\bigcirc}}}\underset{2}{}-CH=\underset{CN}{\overset{}{C}}-CO-A-\overset{\oplus}{\underset{R_3}{\overset{R_1}{N}}}-R_2 \quad 2\,An^{\ominus}$$

| Example No. | $R_1$ | $R_2$ | $R_3$ | A | Substituents on rings a | $R_4$ | $D_5$ | Colour shade of bulk-dyed paper |
|---|---|---|---|---|---|---|---|---|
| 248 | " | " | " | " | — | $CH_3$ | $C_2H_4O$—⟨benzene⟩—O—⟨benzene⟩—$OC_2H_4$ | " |
| 249 | $C_6H_{11}$ | " | " | " | — | " | $C_2H_4NHCO(CH_2)_2CONHC_2H_4$ | " |
| 250 | $CH_3$ | " | " | " | — | $C_2H_5$ | $C_2H_4CONH$—⟨biphenyl with NHCOC$_2$H$_4$, OCH$_3$, CH$_3$O substituents⟩—$C_2H_4CONH$ | " |
| 251 | " | " | " | " | — | " | $C_2H_4NHCONH(CH_2)_6NHCONHC_2H_4$ | " |
| 252 | " | " | " | " | — | $C_2H_4CN$ | $C_2H_4OCONH(CH_2)_6NHCOOC_2H_4$ | " |
| 253 | " | " | " | " | — | $CH_2C_6H_5$ | " | " |
| 254 | " | " | " | " | — | $C_2H_4OC_6H_5$ | " | " |
| 255 | " | " | " | " | 2,2-di-$CH_3$ | $C_2H_5$ | $C_2H_4NHCOCONHC_2H_4$ | " |
| 256 | " | $CH_3$ | $(CH_2)_2O(CH_2)_2$ | $CH_3$ | " | — | " | $CH_2CHSSCHCH_2$ / $CH_3\ CH_3$ | " |
| 257 | " | " | " | " | — | $C_4H_9$ | $CH_2CH=CHCH_2$ | " |
| 258 | " | " | " | " | — | $C_2H_5$ | $C_2H_4O$—⟨benzene⟩—C(=N—N=C)(O)—⟨benzene⟩—$OC_2H_4$ | " |
| 259 | " | " | " | " | 2,2-di-Cl | $C_2H_4COOCH_3$ | $CH_2$—⟨benzene⟩—$CH_2$ | " |

TABLE 7-continued

Structure:
$$R_1, R_2, R_3 - \overset{\oplus}{N} - A - CO - C(CN) = CH - \text{ring a} - N(R_4) - D_5 - N(R_4) - \text{ring a} - CH = C(CN) - CO - A - \overset{\oplus}{N}(R_1)(R_2)(R_3) \cdot 2 An^{\ominus}$$

| Example No. | $R_1$ | $R_2$ | $R_3$ | A | Substituents on rings a | $R_4$ | $D_5$ | Colour shade of bulk-dyed paper |
|---|---|---|---|---|---|---|---|---|
| 260 | " | " | " | " | — | $C_2H_5$ | cyclohexyl-CH$_2$NHCOOC$_2$H$_4$— with $C_2H_4$OCONHCH$_2$— | " |
| 261 | " | " | " | " | — | $CH_3$ | phenyl with $C_2H_4$OCO— and —COOC$_2$H$_5$ (meta) | " |
| 262 | " | " | " | " | — | $C_2H_5$ | $C_2H_4COOC_2H_4$ | " |
| 263 | " | " | " | " | — | $CH_3$ | 1,5-naphthylene with $C_2H_4O$— and —OC$_2$H$_4$ | " |
| 264 | " | " | " | " | — | " | 1,3,4-oxadiazole-2,5-diyl with $C_2H_4OCO$— and —COOC$_2$H$_4$ | " |
| 265 | " | " | " | " | — | " | 2-phenyl-2H-benzotriazol-5-yl with $C_2H_4CONH$— and —NHCOC$_2$H$_4$ | " |

TABLE 7-continued

| Example No. | $R_1$ | $R_2$ | $R_3$ | A | Substituents on rings a $R_4$ | $R_4$ | $D_5$ | Colour shade of bulk-dyed paper |
|---|---|---|---|---|---|---|---|---|
| 266 | " | " | " | " | — | " | (structure shown) | " |

EXAMPLE 267

20 parts of choline chloride are added to a solution of 10.2 parts of cyanoacetic acid in 36.6 parts of acetic anhydride after this solution has been stirred for 1 hour at 50° C. and the mixture is stirred for 1 hour at 30° C., 40 parts of the aldehyde of the formula

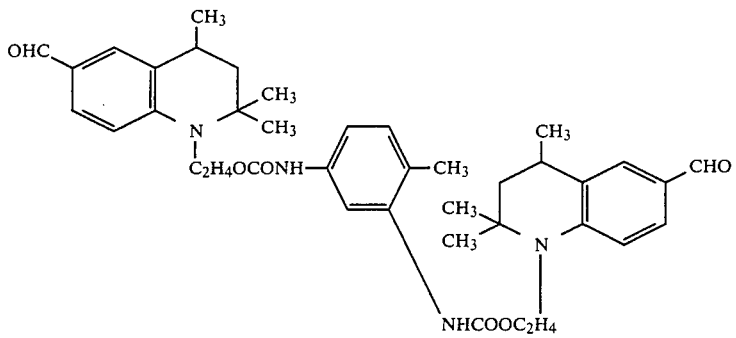

are then added and the resulting mixture is heated to 80° C. for 9 hours. 14 parts of water are then added in order to decompose remaining acetic anhydride and about 120 parts of an approximately 56% strength acetic acid solution of the dyestuff of the formula

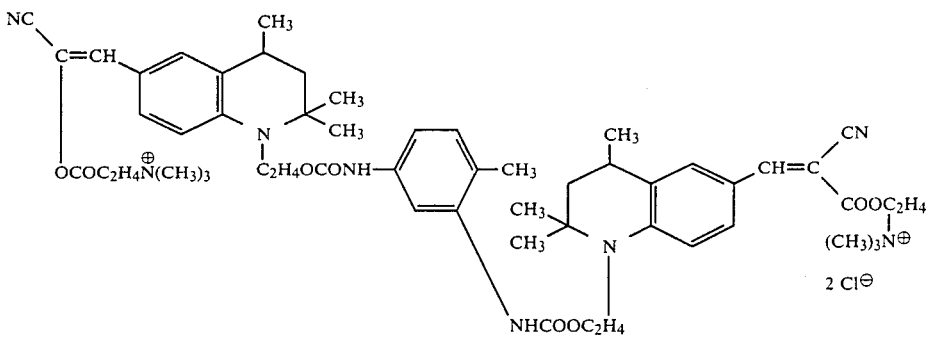

are obtained. ($\lambda_{max}/H_2O = 451$–$452$ nm)

The product has outstanding affinity for lignin-containing paper pulps and gives intense greenish-tinged yellow coloured papers, with very slight staining of the waste water. It is also suitable for dyeing polyacrylonitrile, on which intense, greenish-tinged yellow dyeings with good fastness to light and washing and a good general level of fastness properties are obtained.

Numerous further cyclised bis-quaternary styryl dyestuffs with comparable coloristic properties are prepared analogously to the above example or Example 226 by a procedure which in itself is the same, by choosing appropriate starting materials. A selection is given in Table 8.

TABLE 8

Structure: Bis-cationic dye with two [R_1R_2R_3N⊕-A-CO-C(CN)=CH-(Q_2)-aryl(R')-N-D_5-N-aryl(R')-(Q_2)-CH=C(CN)-CO-A-N⊕R_1R_2R_3] · 2 An⊖

| Example No. | $R_1$ | $R_2$ | $R_3$ | A | R' | $Q_2$ | $D_5$ | Colour shade of bulk-dyed paper |
|---|---|---|---|---|---|---|---|---|
| 268 | $CH_3$ | $CH_3$ | $CH_3$ | $C_2H_4O$ | H | $CH(CH_3)CH_2C(CH_3)_2$ | $C_2H_4OC_2H_4$ | greenish-tinged yellow |
| 269 | " | " | " | " | $CH_3$ | " | " | " |
| 270 | " | " | " | " | H | " | $C_2H_4OCO(CH_2)_4COOC_2H_4$ | " |
| 271 | " | " | " | " | " | " | $C_2H_4OCONH(CH_2)_6NHCOOC_2H_4$ | " |
| 272 | " | $C_2H_4O$—$C_2H_4$ | | " | " | " | $C_2H_4OCO$–C$_6H_4$–$COOC_2H_4$ (para) | " |
| 273 | " | $(CH_2)_5$ | | " | " | " | $C_2H_4O$–C$_6H_4$–$OC_2H_4$ (para) | " |
| 274 | " | $CH_3$ | $CH_3$ | " | " | " | $C_2H_4NHCO$–C$_6H_4$–$CONHC_2H_4$ (meta) | " |
| 275 | " | " | " | " | " | " | $C_2H_4$ | " |
| 276 | $CH_2C_6H_5$ | " | " | " | " | " | $C_2H_4SO_2C_2H_4$ | " |
| 277 | $CH_3$ | " | " | " | " | " | $CH_2$–C$_6H_4$–$CH_2$ (para) | " |
| 278 | $C_2H_5$ | $C_2H_5$ | $C_2H_5$ | " | " | " | $C_2H_4OCOCH=CHCOOC_2H_4$ | " |
| 279 | $C_6H_{11}$ | $CH_3$ | $CH_3$ | " | " | " | $C_2H_4CONH(CH_2)_2NHCOC_2H_4$ | " |
| 280 | $CH_3$ | " | " | " | " | " | $C_2H_4NHCOCONHC_2H_4$ | " |
| 281 | " | " | " | " | " | " | $CH_2CHSCHCH_2$ / $H_3C$  $CH_3$ | " |
| 282 | " | " | " | $(CH_2)_3NH$ | " | " | $C_2H_4SSC_2H_4$ | " |

TABLE 8-continued

Structure:

$$R_1R_2R_3\overset{\oplus}{N}-A-CO-\underset{NC}{C}=CH-\underset{R'}{\underset{|}{C_6H_3}}-N(Q_2)-D_5-N(Q_2)-\underset{R'}{\underset{|}{C_6H_3}}-CH=\underset{CN}{C}-CO-A-\overset{\oplus}{N}R_1R_2R_3 \cdot 2An^{\ominus}$$

| Example No. | R₁ | R₂ | R₃ | A | R' | Q₂ | D₅ | Colour shade of bulk-dyed paper |
|---|---|---|---|---|---|---|---|---|
| 283 | " | " | " | CH₂CHO / CH₃ | " | " | 4-C₂H₄O-C₆H₄-N=N-C₆H₄-O-CO-... (4-C₂H₄O-benzoyloxy azo structure) | " |
| 284 | " | " | " | C₂H₄O | " | " | C₂H₄OCO-... -COOC₂H₄ (azo diester) | " |
| 285 | " | " | " | " | " | CH₂CH(CH₃) | C₂H₄OCOOC₂H₄ | " |
| 286 | " | " | " | " | " | C(CH₃)₂CH(CH₃) | 4,4'-(C₂H₄O)₂-biphenyl | " |
| 287 | " | " | " | " | " | o-tolyl (2-CH₃-C₆H₄) | (CH₂)₃ | " |
| 288 | " | " | " | " | " | " | p-xylylene (CH₂-C₆H₄-CH₂) | " |
| 289 | " | " | " | " | " | OC(CH₃)₂CH(CH₃) | C₂H₄OCO(CH₂)₃COOC₂H₄ | " |
| 290 | " | " | " | " | " | CH(CH₃)CH₂C(CH₃)₂ | C₂H₄OCONH-C₆H₄-CH₂-C₆H₄-NHCOO-C₂H₄ | " |

TABLE 8-continued

Structure:
$$\begin{matrix} R_1 \\ R_2-\overset{\oplus}{N}-A-CO \\ R_3 \end{matrix} \quad \begin{matrix} NC \\ C=CH \end{matrix} - \underset{R'}{\text{Ar}} - N \underset{D_5}{\diagdown} N - \underset{R'}{\text{Ar}} - CH=C \begin{matrix} CN \\ CO-A-\overset{\oplus}{N}-R_2 \\ R_3 \end{matrix} \quad 2\text{ An}^{\ominus}$$

with $Q_2$ substituents on each ring.

| Example No. | $R_1$ | $R_2$ | $R_3$ | A | R' | $Q_2$ | $D_5$ | Colour shade of bulk-dyed paper |
|---|---|---|---|---|---|---|---|---|
| 291 | " | " | " | " | " | " | CHCH$_2$<br>CH$_3$ | " |
| 292 | " | " | " | " | CH$_3$ | OCH$_2$CH(CH$_3$) | C$_2$H$_4$OCONHCH$_2$—⟨cyclohexyl⟩—CH$_2$NHCO—OC$_2$H$_4$ | " |
| 293 | " | " | " | " | " | " | C$_2$H$_4$OCONH—⟨C$_6$H$_4$⟩—CH$_2$ | " |
| 294 | " | " | " | " | " | SCH$_2$CH(CH$_3$) | C$_2$H$_4$OCONH—⟨C$_6$H$_3$(CH$_3$)⟩—NHCOOC$_2$H$_4$ | yellow |
| 295 | " | " | " | " | H | CH$_2$CH$_2$CH(CH$_3$) | C$_2$H$_4$CH$_2$—⟨C$_6$H$_4$⟩—CH$_2$OC$_2$H$_4$ | greenish-tinged yellow |
| 296 | " | " | " | " | " | " | C$_2$H$_4$O—⟨C$_6$H$_4$⟩—O—⟨C$_6$H$_4$⟩—OC$_2$H$_4$ | " |
| 297 | " | " | " | " | " | CH(CH$_3$)CH$_2$C(CH$_3$)$_2$ | C$_2$H$_4$COOC$_2$H$_4$ | " |

EXAMPLE 298

The quantity of polyacrylonitrile fibres (®Dralon) corresponding to a liquor ratio of 1:40 is introduced at 40° C. into an aqueous dye bath which contains, per 1,000 parts by volume, 0.75 part of 30% strength acetic acid, 0.38 part of sodium acetate and 0.15 part of the dyestuff described in Example 1, the bath is heated to the boil in the course of 20–30 minutes and dyeing is carried out at the boil for 30–60 minutes. The subsequently rinsed and dried dyed material displays a brilliant, greenish-tinged yellow dyeing which is distinguished in general by good fastness properties and especially by very good fastness to light, washing and decatising.

If polyacrylonitrile fibres wet-spun under the conditions of the so-called NEOCHROM process are dyed in the gel state with the same dyestuff, dyeings with a comparably high level of fastness properties are again obtained.

EXAMPLE 299

A stock solution prepared from 15 parts of the dyestuff according to Example 48a, 15 parts of polyacrylonitrile (®Dralon) and 70 parts of dimethylformamide is added to a conventional spinning solution of polyacrylonitrile in the desired amount and the coloured solution is spun in a known manner. Polyacrylonitrile filaments result which have a greenish-tinged yellow coloration and outstanding fastness properties, especially very good fastness to light, washing and decatising.

EXAMPLE 300

A fabric made of polyacrylonitrile (®Dralon) is printed with a printing paste of the following composition: 30 parts of the dyestuff described in Example 5, 50 parts of thiodiethylene glycol, 30 parts of cyclohexanol, 30 parts of 30% strength acetic acid, 500 parts of crystal gum, 30 parts of an aqueous solution of zinc nitrate ($d = 1.5$ gcm$^{-3}$) and 330 parts of water.

The resulting brilliant, greenish-tinged yellow print is dried, steamed for 30 minutes and then rinsed. It is distinguished by very good fastness properties.

EXAMPLE 301

Acid-modified polyglycol terephthalate fibres (®Dacron 64 type or of the type described in Belgian Patent Specification No. 549,179 and in U.S. Pat. No. 2,893,816) are introduced at 20° C., and using a liquor ratio of 1:40, into a dyebath which contains, per 1,000 parts by volume, 3–10 parts of sodium sulphate, 0.1–2 parts of oleyl polyglycol ether (containing 50 mols of ethylene oxide), 0–15 parts of dimethylbenzyldodecylammonium chloride and 0.3 part of the dyestuff according to Example 33 and has been adjusted to a pH value of 4.5–5.5 with acetic acid or sodium acetate. The bath is heated to 98° C. in the course of 30 minutes and is kept at this temperature for 60 minutes. After subsequent rinsing and drying of the fibres, the latter display a brilliant, greenish-tinged yellow dyeing with good fastness properties.

EXAMPLE 302

In a dye beaker having a capacity of 500 parts by volume, which is in a heated waterbath, 0.15 part of the dyestuff solution according to Example 227 is made up, after adding 0.5 part of oleyl polyglycol ether (containing 50 mols of ethylene oxide), to 500 parts by volume with water and the pH value of the dye liquor is adjusted to 4.5–5. 10 parts of piece goods of acid-modified polyamide are continuously agitated in this liquor, whilst the bath temperature is raised to 100° C. in the course of 15 minutes. After dyeing at the boil for 15–20 minutes, the dyed material is rinsed and dried, for example by ironing or at 60°–70° C. in a drying cabinet. A clear, greenish-tinged yellow dyeing with good fastness properties is obtained.

EXAMPLE 303

A dry stock consisting of 60% of wood pulp and 40% of unbleached sulphite pulp is mixed, in a hollander, with an amount of water, and beaten to a freeness of 40° SR, such that the solids content is somewhat more than 2.5% and the solids content of the high consistency stock is then adjusted to exactly 2.5% with water.

5 parts of a 0.25% strength aqueous solution of the dyestuff according to Example 112 are added to 200 parts of this high consistency stock, the mixture is stirred for about 5 minutes, 2% of resin size and 4% of alum, relative to the dry stock, are added and the mixture is again stirred for several minutes until homogeneous. The pulp is diluted with about 500 parts of water to 700 parts by volume and paper sheets are produced herefrom in a known manner by sucking off through a sheet-forming machine. The paper sheets display an intense, greenish-tinged yellow coloration. The amount of dyestuff not bound to the paper, which is determined photometrically (at $\lambda_{max} = 455$ nm) in the waste water from the sheet-forming machine, is about 3%. When unsized paper pulp is dyed, the amount of non-fixed dyestuff determined with an otherwise identical procedure is about 4%.

Under the above operating conditions, virtually all of the dyestuffs according to the invention display similarly low levels of staining of the waste water.

EXAMPLE 304

5 parts of a 0.5% strength aqueous solution of the acetic acid solution of the dyestuff of the formula

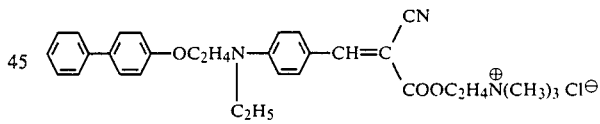

($\lambda_{max}$ in H$_2$O = 440 nm) prepared analogously to Example 2—from N-ethyl-β-(p-xenyloxy)ethyl-4-aminobenzaldehyde—are added to 200 parts of a 2.5% strength high consistency stock (freeness 35° SR) prepared analogously to Example 303 but using bleached sulphite pulp only and the resulting pulp is processed, without the addition of resin size and alum, to paper. Sheet paper dyed in a deep greenish-tinged yellow shade is obtained. According to photometric determination, the waste water contains only about 4% of the dyestuff employed. If the dyeing of the paper pulp is carried out in the presence of 2% of resin size and 4% of alum (compare Example 303), a similar result is obtained and only about 2% of the dyestuff remain in the waste water.

EXAMPLE 305

10 parts of the paper dyed according to Example 303 are warmed in 200 parts of water, with the addition of 0.2 part of sodium sulphite and 0.1 part of sodium bisulphite, to 60° C. for 1 hour. The paper pulp is completely decolorised; it can be re-fed to a dyeing and papermaking installation (recycling).

The same result is obtained when 2% of sodium dithionite is used as the reducing agent (60°/30 minutes) or when the dyed bleached sulphite pulp of Example 304 is employed.

I claim:

1. Cationic styryl dyestuff of the formula

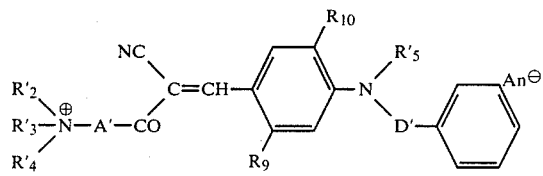

wherein $R'_2$ denotes $C_1-C_4$-alkyl, or benzyl or $\alpha$- or $\beta$-phenylethyl unsubstituted or substituted by 1–2 chlorine, $C_1-C_4$-alkyl or $C_1-C_4$-alkoxy groups, or cyclopentyl or cyclohexyl unsubstituted or substituted by 1–2 $C_1-C_4$-alkyl groups, $R'_3$ denotes hydrogen or $C_1-C_4$-alkyl and $R'_4$ denotes $C_1-C_4$-alkyl, or $R'_2$, $R'_3$ and $R'_4$ together with the nitrogen atom to which they are bonded form imidazole or pyridine which is unsubstituted or substituted by 1 or 2 $C_1-C_4$-alkyl groups, or $R'_3$ and $R'_4$ together with the nitrogen atom to which they are bonded form piperidine, pyrrolidine, morpholine, piperazine or hexamethyleneimine which is unsubstituted or substituted by 1–4 $C_1-C_4$-alkyl groups, $R'_5$ denotes $C_1-C_4$-alkyl, or phenyl, benzyl or $\alpha$- or $\beta$-phenylethyl unsubstituted or substituted by 1–2 chlorine, cyano, $C_1-C_4$-alkyl or $C_1-C_4$-alkoxy groups, $R_9$ denotes hydrogen, $C_1-C_4$-alkyl, $C_1-C_4$-alkoxy or chlorine and $R_{10}$ denotes hydrogen or $C_1-C_4$-alkoxy, or $R'_5$ and $R_{10}$ together with the benzene ring and the nitrogen atom to which $R'_5$ is bonded form an indoline, tetrahydroquinoline or 2,3-dihydro-1,4-benzoxazine radical which is unsubstituted or substituted in the heterocyclic part by 1–4 $C_1-C_4$-alkyl or phenyl, or form a carbazole, phenoxazine or phenthiazine radical which is unsubstituted or substituted by 1–2 $C_1-C_4$-alkyl, $A'$ denotes

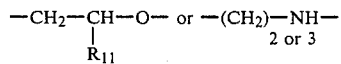

which link via the hetero-atom to the CO group, $R_{11}$ denotes hydrogen, $C_1-C_4$-alkyl or phenyl which is unstituted or substituted by 1–2 chlorines or $C_1-C_4$-alkyls, $D'$ denotes a direct bond or

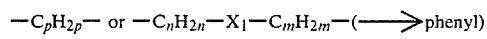

in which
m is 0–4,
n is 1–4,
p is 1–4 and $X_1$ is O, S, SO$_2$, COO, OCO, NR$_6$—CO, CO—NR$_6$, NR$_6$—SO$_2$, SO$_2$—NR$_6$, NCOR$_7$, NHCONH, OCO—NH, NH—COO, OCO—CH$_2$—S, OCO—CH=CH or OCO—CH$_2$O, $R_6$ is H, CH$_3$, C$_2$H$_5$, allyl or benzyl;

$R_7$ is H or CH$_3$; and

An$^\ominus$ represents an anion, and wherein the abovementioned alkyl radicals are unsubstittuted or substituted by 1–2 chlorine, cyano, $C_1-C_4$-alkoxy, phenoxy, naphthoxy, benzyloxy, benzoyloxy, allyloxy, $C_1-C_4$-alkylcarbonyloxy or $C_1-C_4$-alkoxycarbonyl groups, and the phenyl groups, in turn, are unsubstituted or substituted by 1–2 cyano or $C_1-C_4$ alkoxy groups.

2. A cationic styryl dyestuff according to claim 1 of the formula

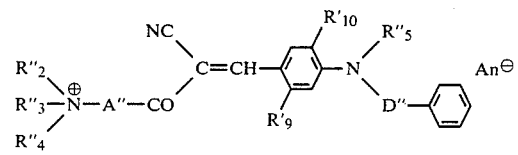

wherein $R''_2$ denotes methyl, ethyl or benzyl, $\beta$-phenylethyl, 2-benzoxyethyl or 2-phenoxyethyl substituted by one chlorine or methyl, or cyclohexyl, $R''_3$ denotes methyl or ethyl and $R''_4$ denotes methyl or ethyl, or $R''_2$, $R''_3$ and $R''_4$ together with the nitrogen atom to which they are bonded form pyridine which is unsubstituted or substituted by 1–2 methyl or ethyl radicals, or $R''_3$ and $R''_4$ together with the nitrogen atom to which they are bonded form piperidine, pyrrolidine morpholine, piperazine, or N-ethyl or N-methylpiperazine $R''_5$ designates $C_1-C_4$-alkyl which is unsubstituted or substituted by one chlorine, cyano, acetoxy, phenyl, benzoxy, benzoyloxy or phenoxy, or phenyl unsubstituted or substituted by chlorine, methyl, or ethyl, $R'_9$ denotes hydrogen, methyl, ethyl, methoxy, ethoxy or chlorine and $R'_{10}$ denotes hydrogen, methoxy or ethoxy, or $R''_5$ and $R'_{10}$ together with the nitrogen atom and the benzene nucleus to which they are bonded form an indoline or tetrahydroquinoline radical which is unsubstituted or substituted in the heterocyclic part by 1–3 methyl groups, or a carbazole, phenoxazine or phenthiazine radical which is unsubstituted or substituted by 1–2 methyl groups, $A''$ denotes

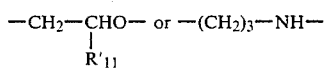

which link via the hetero-atom to the CO group, and $R'_{11}$ denotes hydrogen, methyl, ethyl, phenyl, p-tolyl or methyl which is substituted by $C_1-C_4$-alkoxy, phenoxy, benzoxy, phenylethoxy, allyloxy, benzoyloxy or acetoxy, $D''$ designates —$C_mH_{2m}$— or —$C_nH_{2n}$—$X'_1$—$C_mH_{2m}$— (—>phenyl), $m = 0-4$, $n = 2-4$ and—if $X'_1$ links to $C_nH_{2n}$ via a CO or $SO_2$ functional group—also 1 and $X'_1$ represents O, S, $SO_2$, COO, OCO, $NR'_6$—CO, CO—$NR'_6$, $NR'_6$—$SO_2$, $SO_2$—$NR'_6$, N—CO—$CH_3$, NH—CO—NH, O—CO—NH, O—CO—$CH_2$—O or $OCOCH_2S$ and $R'_6$ is H, $CH_3$, $C_2H_5$ or benzyl, and the phenyl ring attached to D" is unsubstituted or substituted by 1-4 methyl, 1-2 $C_2$-$C_4$-alkyl or $C_1$-$C_4$-alkoxy.

3. A cationic styryl dyestuff according to claim 1 of the formula

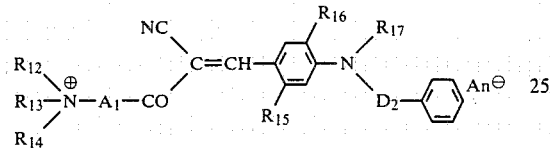

wherein $R_{12}$ designates methyl, ethyl, cyclohexyl, benzyl, β-phenylethyl or β-phenoxyethyl, $R_{13}$ designates a methyl or ethyl, and $R_{14}$ designates a methyl or ethyl, or $R_{12}$, $R_{13}$ and $R_{14}$ together with the nitrogen atom to which they are bonded form pyridinyl or picolinyl, or $R_{13}$ and $R_{14}$ together with the nitrogen atom to which they are bonded, form pyrrolidinyl, piperidinyl, or morpholinyl, $A_1$ denotes

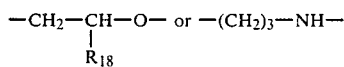

which links via the hetero-atom to the CO group, and $R_{18}$ is H, $CH_3$, $C_2H_5$, $C_6H_5$, $CH_2$—O—$C_1$-$C_4$-alkyl, $CH_2$—O—$C_6H_5$, $CH_2$—O—allyl or

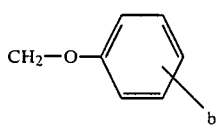

in which b is H, $CH_3$ or $C_2H_5$, $R_{15}$ denotes hydrogen, methyl, ethyl, methoxy or ethoxy, $R_{16}$ denotes hydrogen, methoxy or ethoxy, $R_{17}$ denotes phenyl or $C_1$-$C_4$-alkyl which is unsubstituted or substituted by one chlorine, cyano, phenyl, phenoxy, benzoxy, benzoyloxy or acetoxy, or phenyl substituted by one methyl or two chlorine, $D_2$ denotes a direct bond or $CH_2$, $C_2H_4$, $CH_2$—$CH(CH_3)$, $(CH_2)_3$, $CH_2CH(C_2H_5)$, $CH_2$—$CH(C_6H_5)$, $C_2H_4$—$X_3$—$(CH_2)_{0 \text{ or } 1}$ or $$CH_2-\underset{CH_3}{\underset{|}{CH}}-X_3-(CH_2)_{0 \text{ or } 1},$$

wherein $X_3$ represents the hetero-atoms or groupings O, S, COO, OCO, CO—$NR_{19}$, $NR_{19}$—CO, $SO_2$—$NR_{19}$, $NR_{19}$—$SO_2$ (and $R_{19}$ is H, $CH_3$ or $C_2H_5$), OCONH, O—CO—$CH_2$—S or OCO—$CH_2$—O.

4. Cationic styryl dyestuffs according to claim 3, characterised in that $R_{12}$ denotes methyl, ethyl, cyclohexyl or benzyl, $R_{13}$ denotes methyl or ethyl;

$R_{14}$ denotes methyl or ethyl; or $R_{12}$, $R_{13}$ and $R_{14}$ together with the nitrogen atom denote pyridine; or $R_{13}$ and $R_{14}$ together with the nitrogen atom denote piperidine, $A_1$ denotes

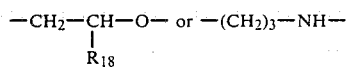

and $R_{18}$ is H, $CH_3$ or $C_6H_5$, $R_{15}$ denotes hydrogen or methyl, $R_{16}$ denotes hydrogen, $R_{17}$ denotes methyl or ethyl, and $D_2$ denotes $CH_2$ or $(CH_2)_2$.

5. A dye represented by the structure

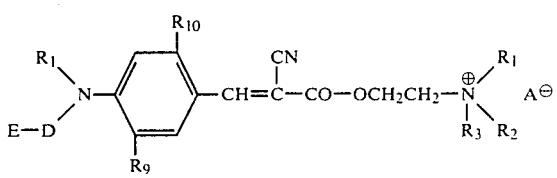

where $R_1$ is $C_1$-$C_4$-alkyl or $C_1$-$C_4$-alkyl substituted by one cyano,

D is —$CH_2$—,

E is phenyl, $R_9$ is hydrogen, $R_{10}$ is hydrogen or methyl, $R_1$, $R_2$ and $R_3$ are each methyl or together with the nitrogen to which they are bonded form pyridine or $R_1$ is methyl and $R_2$ and $R_3$ together with the nitrogen atom to which they are bonded form morpholine, and A is an anion.

6. A dye represented by the structure

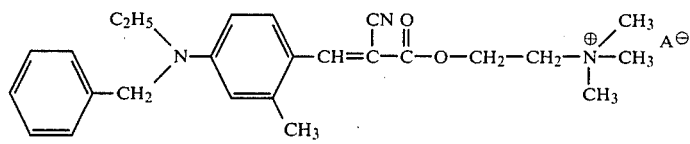
where A is an anion.
7. A cationic styryl dyestuff according to claim 3, of the formula
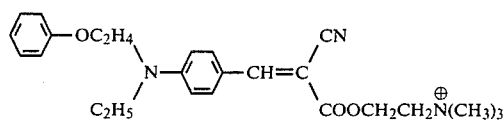
8. A dye represented by the structure
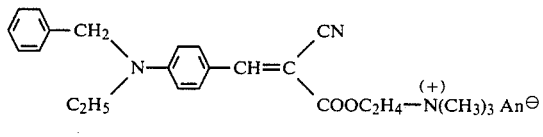
where A is an anion.
* * * * *